(12) United States Patent
Okazaki et al.

(10) Patent No.: US 7,451,745 B2
(45) Date of Patent: Nov. 18, 2008

(54) FUEL TANK FOR MOTORCYCLE

(75) Inventors: Kazumi Okazaki, Wako (JP); Toshiaki Takamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 11/142,240

(22) Filed: Jun. 2, 2005

(65) Prior Publication Data
US 2005/0279330 A1 Dec. 22, 2005

(30) Foreign Application Priority Data
Jun. 4, 2004 (JP) ............................. 2004-167532

(51) Int. Cl.
F02M 37/04 (2006.01)
(52) U.S. Cl. .................................... 123/509
(58) Field of Classification Search ................ 123/514, 123/509, 510; 137/565.17; 280/835
See application file for complete search history.

(56) References Cited

U.S. PATENT DOCUMENTS

| | | | | |
|---|---|---|---|---|
| 4,397,333 A | * | 8/1983 | Liba et al. | 137/574 |
| 4,546,750 A | * | 10/1985 | Brunell et al. | 123/514 |
| 4,763,633 A | * | 8/1988 | Nakanishi | 123/514 |
| 5,797,376 A | * | 8/1998 | Frank et al. | 123/509 |
| 6,182,640 B1 | * | 2/2001 | Nakashima et al. | 123/516 |
| 6,253,790 B1 | | 7/2001 | Hara | |
| 6,401,750 B2 | * | 6/2002 | Tokunaga | 137/565.34 |
| 6,932,177 B2 | * | 8/2005 | Hara et al. | 180/219 |

FOREIGN PATENT DOCUMENTS

| | | |
|---|---|---|
| DE | 3612194 | 10/1986 |
| EP | 1245423 | 10/2002 |
| JP | 2000-072074 | 3/2000 |

* cited by examiner

*Primary Examiner*—Thomas N Moulis
(74) *Attorney, Agent, or Firm*—Westerman, Hattori, Daniels & Adrian, LLP.

(57) ABSTRACT

A fuel tank is provided for a motorcycle having a main body part and a downward swelling part that is opened upward and attached to a bottom part of the fuel tank. The inside of the downward swelling part is connected to the inside of the main body part, thereabove. A fuel pump is provided having a suction part disposed in the downward swelling element and a portion above the suction part installed in the main body part of the fuel tank. A fuel retaining member is also provided in the downward swelling part, whereby fuel retained by the fuel retaining member is sucked by the suction part.

3 Claims, 23 Drawing Sheets

FUEL TANK FOR MOTORCYCLE

FIELD OF THE INVENTION

The present invention relates to a motorcycle having a built-in fuel pump, and more particularly relates to a motorcycle capable of continuing a supply of fuel for a certain amount of time even if a vehicle body is tilted at an acute angle.

BACKGROUND OF THE INVENTION

When the position of a vehicle body is altered due to rapid acceleration, sudden slowdown or driving on an inclined slope in a state of a low fuel level, it changes the level of fuel in the fuel tank, making it difficult for a fuel pump to suck in the fuel. To enable the fuel pump to continue to suck in fuel in such driving conditions, there has been known a structure in which a cup is protruded to a lower part of a fuel tank, a suction part of a fuel pump is set in the cup, and an opening width of the cup is narrowed to make it easy for fuel to remain in a downward swelling part even if attitude of a vehicle is changed. One example of such a structure is disclosed in Japanese Patent Laid-Open No. 2000-72074.

However, even by use of the foregoing structure, when the vehicle climbs a steep slope for a relatively long distance, a necessary fuel may not be retained in the cup. Such a case may arise, for example, when the vehicle climbs up a steep slope (for example, a slope with a tilt angle of nearly 70°) such as in off-road racing and in trial racing. In such a situation, it may be required to continue suction of the fuel. Accordingly, it is an object of the invention of the present application to continue supply of the fuel for a predetermined time when the position of the vehicle body undergoes an extreme change.

SUMMARY OF THE INVENTION

In a first aspect of the present invention provides a fuel tank having a downward swelling part with a shape of a container which swells downward and is opened upward is attached to a bottom part of a fuel tank supported by a vehicle body frame, inside of the downward swelling part is connected to inside of a main body part of the fuel tank thereabove, a suction part of a fuel pump is housed in the downward swelling part, and a portion above the suction part of the fuel pump is installed in the main body part of the fuel tank, wherein a fuel retaining member is loaded in the downward swelling part, and fuel retained by the fuel retaining member is sucked by the suction part.

Since the fuel retaining member is loaded in the downward swelling part provided in the bottom part of the fuel tank, even if the motorcycle undergoes an extremely large change in attitude when climbing up a slope or the like in a state of a low fuel level in the fuel tank, necessary fuel can be retained in the downward swelling part. Moreover, as compared to the case where the fuel retaining member is provided in the fuel tank, a total amount of the fuel retaining member can be reduced. Thus, weight and costs can be reduced.

In another aspect of the present invention, a cover is disposed between the downward swelling part and the bottom part of the fuel tank, and distribution of the fuel between the downward swelling part and the main body part of the fuel tank is enabled through any of one and a plurality of communicating holes provided in the cover.

Since the cover is provided between the downward swelling part and the fuel tank, the fuel retaining member is easily retained in the downward swelling part. Moreover, one or a plurality of communicating holes for distributing the fuel between the downward swelling part and the fuel tank are provided in the cover. Thus, by changing an area, the number and disposition of the communicating holes, it is possible to effectively prevent the fuel in the downward swelling part from jumping out toward the tank.

In another aspect of the present invention, a vertical wall is provided around the communicating hole of the cover. The vertical wall provided around the communicating hole makes it possible to further prevent the fuel in the downward swelling part from jumping out toward the tank.

In another aspect of the present invention, the cover is a sealing member interposed between the bottom part of the fuel tank and the downward swelling part. Accordingly, the number of components can be reduced.

In another aspect of the present invention the downward swelling part includes a plurality of attachment holes for cover, the cover has a plurality of protrusions protruded downward, the protrusions are inserted into and engaged with the attachment holes of the downward swelling part to be attached thereto, and the fuel pump is inserted into the communicating hole of the cover and fixed to the downward swelling part.

Accordingly, the downward swelling part, the fuel retaining member, the fuel pump and the cover also serving as the sealing member are sub-assembled and can be assembled into the fuel tank in this state. Thus, an assembly process can be simplified. In this event, the cover is positioned and attached to the downward swelling part just by inserting the plurality of protrusions into the attachment holes of the downward swelling part. Thus, a sealing property for the fuel can be improved, and the assembly process can be simplified.

In another aspect of the present invention the cover includes a ceiling part for sealing a gap between the pump and the vertical wall, and the ceiling part seals at least a part of a rear side of the gap in a front to rear direction of a vehicle body.

Since the ceiling part is provided in the cover to seal at least a part of the rear side of the gap formed between the pump and the vertical wall on the rear side of the vehicle body, even if the front part of the vehicle body is lifted at an acute angle, the fuel is unlikely to flow out to the outside from the gap formed between the pump and the vertical wall. As a result, large quantities of fuel can be retained.

In another aspect of the present invention the cover includes a ceiling part for approximately sealing a gap between the pump and the vertical wall, and the vertical wall has a communicating hole in a front part thereof in a front to rear direction of a vehicle body.

Thus, when the front part of the vehicle body is lifted at an acute angle, the fuel is unlikely to flow out to the outside from the communicating hole. As a result, large quantities of fuel can be retained. In addition, the use of the communicating hole in combination with the sealing part achieves more effective retention of the fuel.

In another aspect of the present invention the fuel retaining member is any of a member formed by laminating fibers and a spongy member. Thus, the member is relatively inexpensive and more easily loaded into the downward swelling part. It is also possible to use the member in place of a fuel filter.

In another aspect of the present invention the fuel tank includes a return pipe for discharging excess fuel, which is returned from a pressure regulator of a fuel supply system, into the downward swelling part, and an outlet of the return pipe is disposed at a position distant from the suction part of the fuel pump through the fuel retaining member.

Accordingly, when the excess fuel discharged into the downward swelling part from the pressure regulator of the fuel supply system is sucked into the fuel pump through the fuel retaining member, air bubbles contained in the excess fuel are eliminated in the fuel retaining member. Therefore, it is possible to prevent the fuel pump from sucking the fuel containing the air bubbles.

BRIEF DESCRIPTION OF THE DRAWINGS

Embodiments of the invention will be described hereinafter with reference to the accompanying drawings, wherein.

DETAILED DESCRIPTION OF THE INVENTION

With reference to drawings, description will be given below of an embodiment of the invention of the present application applied to a motorcycle for off-road racing. Note that the motorcycle is an example of a saddle-riding type vehicle.

Figure 1:
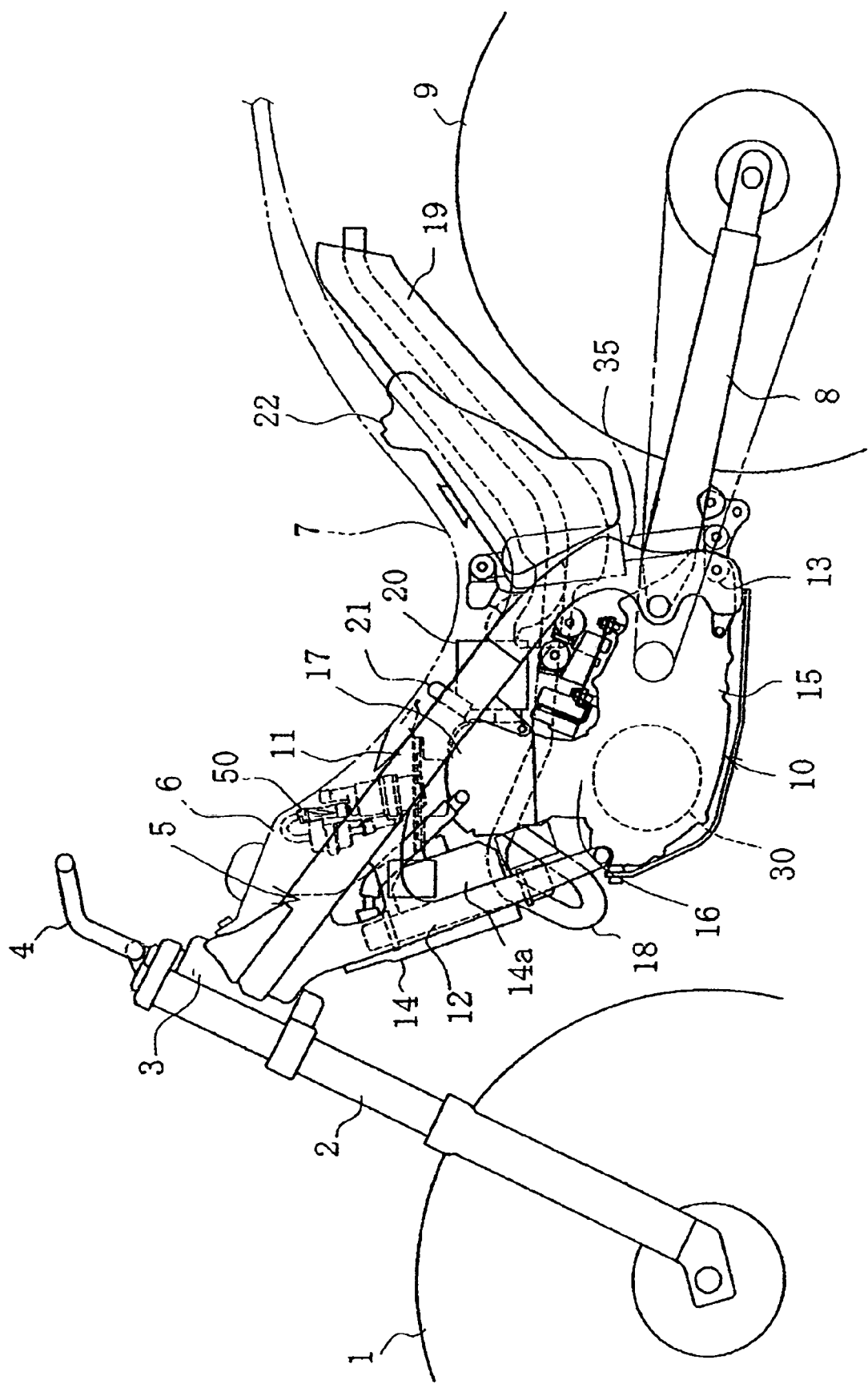
FIG. 1 is a side view of a motorcycle according to an embodiment.

FIG. 1 shows a side of the motorcycle. Reference numeral 1 is a front wheel, reference numeral 2 is a pair of left and right front forks which support both sides of the front wheel 1 on their lower ends, reference numeral 3 is a head pipe which steerably supports upper part of the front forks 2, reference numeral 4 is handlebars, reference numeral 5 is a vehicle body frame, reference numeral 6 is a fuel tank supported on main frames 11, reference numeral 7 is a seat, reference numeral 8 is a rear arm having its front end axially supported by a rear part of the vehicle body frame, reference numeral 9 is a rear wheel supported on a rear end of the rear arm 8, and reference numeral 10 is an engine supported by the vehicle body frame 5.

The vehicle body frame 5 includes: the pair of left and right main frames 11 disposed backward and obliquely downward above the engine 10; a down frame 12 disposed obliquely downward from the head pipe 3 toward the front of the engine 10; and a pair of left and right pivot frames 13 extended downward from rear ends of the main frames 11. The pivot frames 13 swingably support the front end of the rear arm 8 by use of a pivot shaft 13a.

The engine 10 is a water-cooled four-cycle engine which is cooled by a radiator 14 supported by the down frame 12. The engine 10 includes: a crankcase 15; a cylinder 16 protruded upward in a front part of the crankcase 15; and a cylinder head 17 provided above the cylinder 16. The engine 10 is supported by the vehicle body frame 5.

Figure 2:
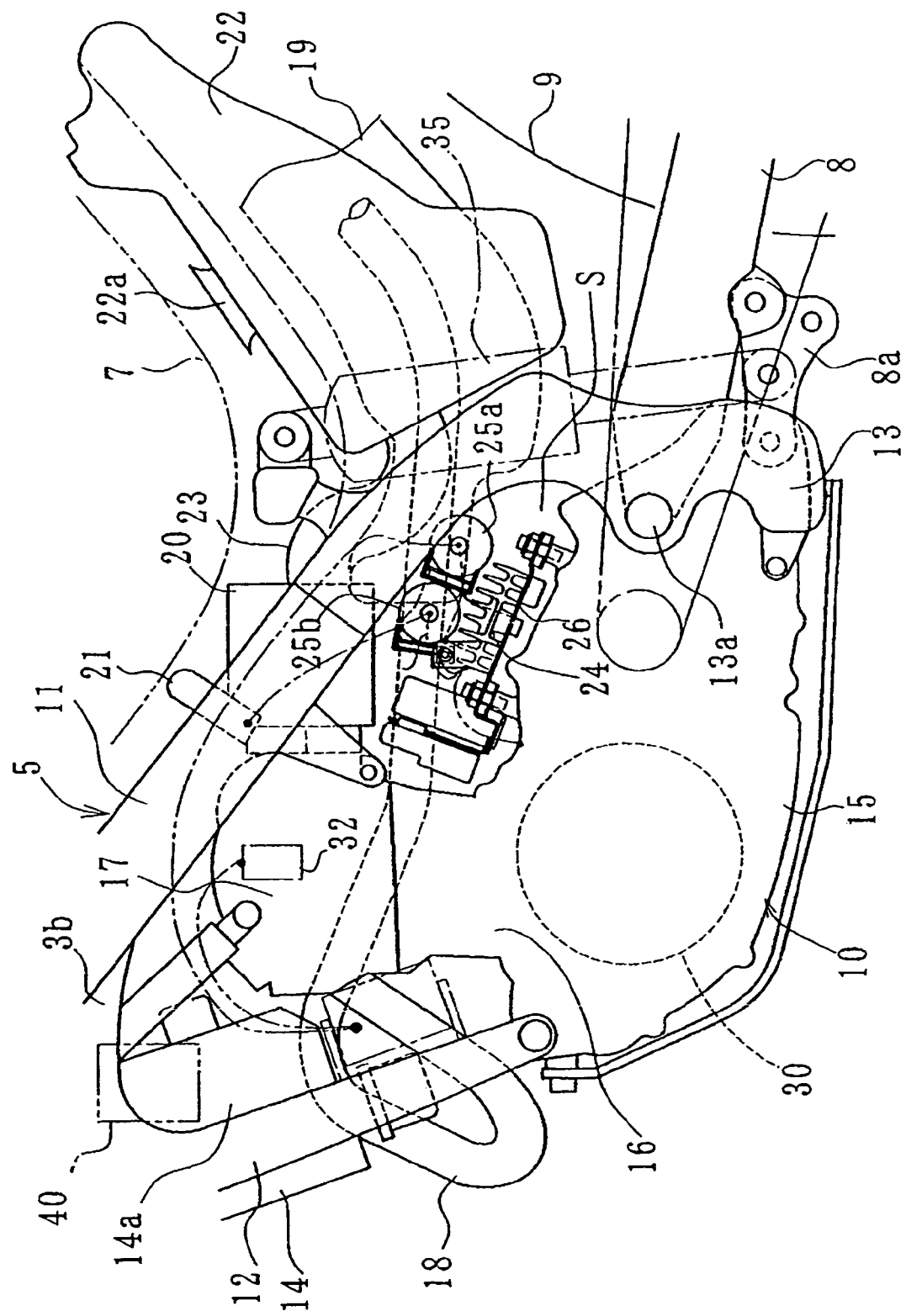
FIG. 2 is an enlarged side view of a main part of a vehicle body.

FIG. 2 enlargedly shows a main part in FIG. 1. In front of the cylinder head 17, a cooling fan 14a of the radiator 14 is positioned. Moreover, an exhaust pipe 18 is extended once forward from a front face of the cylinder head 17 and is subsequently bent and extended backward. The exhaust pipe 18 is connected to a muffler 19 at its rear end.

A throttle body 20 and an electronic fuel injector 21 are connected to an inlet passage opened on a back face side of the cylinder head 17. The throttle body 20 has a built-in throttle valve, and clean air is supplied thereto through a connecting tube 23 from an air cleaner 22 disposed behind the throttle body 20. The air cleaner 22 sucks in outside air downward from an intake 22a opened obliquely upward toward a lower side of the seat 7. The throttle body 20 and the air cleaner 22 constitute an engine inlet system. The electronic fuel injector 21 receives fuel from the fuel tank 6 and supplies the fuel to the inlet passage by electromagnetic drive.

As shown in the side view, the crankcase 15, the cylinder 16, the cylinder head 17 and the main frames 11 form a space S having an approximately triangular shape. By use of this space S, a regulator 24, a first condenser 25a and a second condenser 25b are disposed. The components described above are supported by an electric component installation stay 26 in a portion behind the cylinder 16 on the top surface of the crankcase 15.

As a power source for the electric components described above, an alternating current of an AC generator 30 built in a front portion of the crankcase 15. A power circuit is of a batteryless type without a battery. The alternating current of the AC generator is rectified into a direct current as well as has its voltage regulated by the regulator 24, and is smoothed by the first and second condensers 25a and 25b. The first condenser 25a supplies power for various electric components other than the fuel injector 21, such as ignition power for a spark plug 32 of the cylinder head 17.

Reference numeral 35 in the drawing is a rear cushion, which is disposed in a vertical direction and connects an upper end of the pivot frame 13 to a cushion ring 8a provided below a front portion of the rear arm 8. Reference numeral 40 is a secondary air valve for purifying exhaust gas, which is supported by a gusset 3b connecting a front portion of the main frame 11 to an upper portion of the down frame 12. In addition, the secondary air valve 40 is positioned in the vicinity of an exhaust port of the cylinder head 17, to which the exhaust pipe 18 is connected, that is, in front of and obliquely above the exhaust port.

Figure 3:
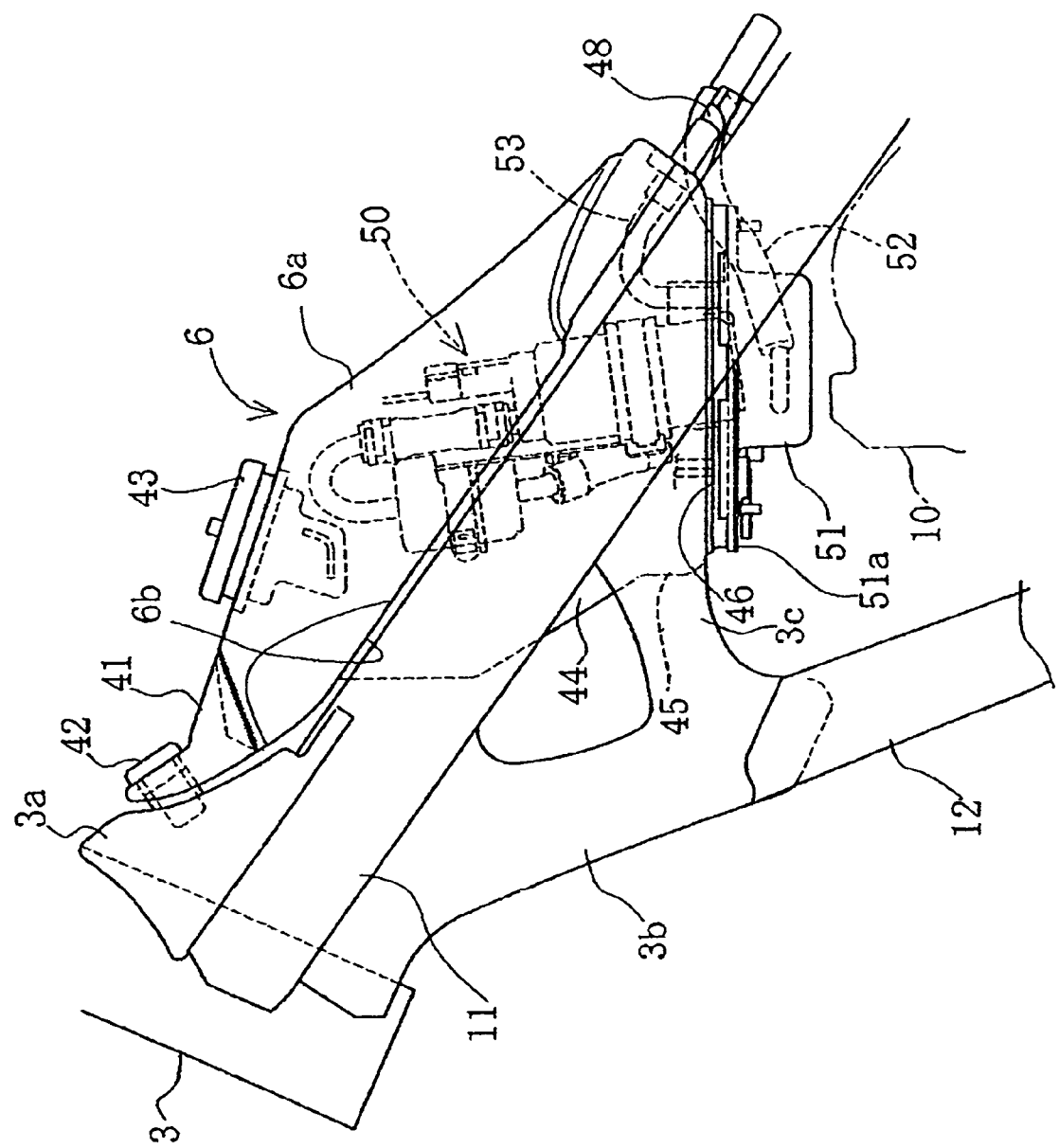
FIG. 3 is a side view mainly showing a fuel tank part.

FIG. 3 shows a shape in a side view of the fuel tank 6 part in a state where the fuel tank is supported by the main frames 11. In the drawing, on a side of the fuel tank 6, a flange part 6b is formed parallel to each of upper surfaces of the pair of left and right main frames 11 disposed obliquely upward. An upper end of the flange part 6b forms a front tank stay 41 protruded obliquely upward and forward. The front tank stay 41 is attached to a gusset 3a with a bolt 42 so as to absorb vibration, the gusset 3a being provided between a front end of the main frame 11 and the head pipe 3. On the top of the fuel tank 6, that is, in the vicinity of the front tank stay 41, a cap 43 is provided. Similarly, in a rear end of the fuel tank 6, a rear tank stay 48 is attached to an upper surface of a cross member, which is provided between the left and right main frames 11, so as to absorb vibration.

A lower part 44 of the fuel tank 6 is protruded downward between the left and right main frames 11. A bottom part 45 of the fuel tank 6 is disposed so as to approximately overlap an arm part 3c of the gusset 3b provided between the down frame 12, the head pipe 3 and the main frame 11, when viewed from the side. Specifically, the arm part 3c is extended backward approximately horizontally. In this bottom part 45, a bottom of a fuel pump unit 50 to be built into the fuel tank is attached.

A cup 51, which forms the bottom of the fuel pump unit 50 and is an example of a downward swelling part of the invention of the present application, is protruded downward and exposed from the arm part 3c and the main frame 11. The cup 51 is disposed in the vicinity of a top of a cylinder head 17 of the engine. A part of the fuel tank 6 above the cup 51 is set to be a main body part 6a. Fuel having entered the cup 51 is sucked up by the fuel pump unit 50 and supplied to the fuel injector 21 (FIG. 2) through a fuel hose 52 connected to the outside of the cup 51. Moreover, excess fuel returned from a pressure regulator of the fuel injector 21 that is a fuel supply system is configured to be returned into the cup 51 through a return pipe 53. The cup 51 is a part which functions as an auxiliary tank. The capacity of the cup 51 is set so as to enable fuel supply for a predetermined time only by use of the fuel in the cup 51.

Figure 4:
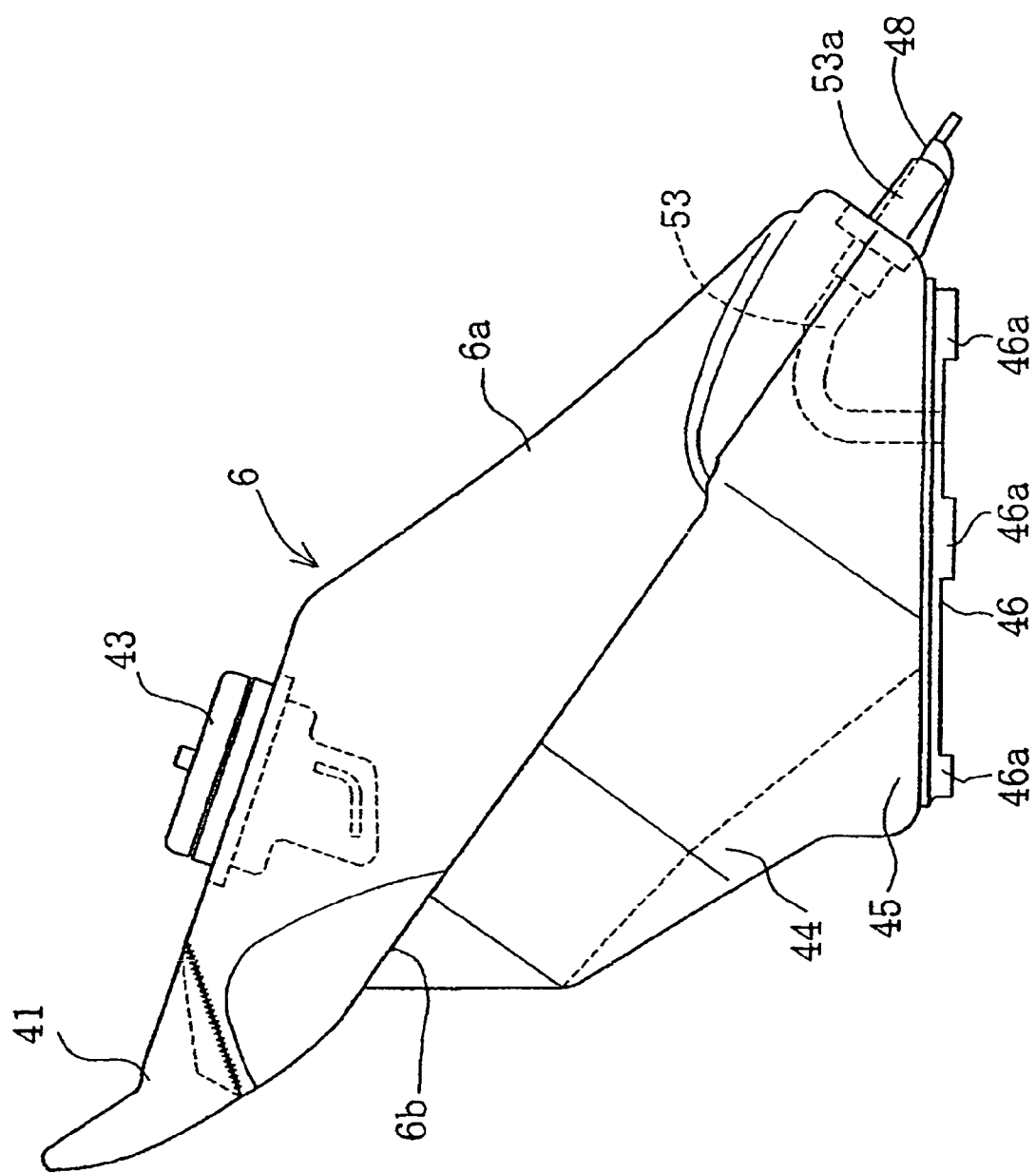
FIG. 4 is a side view of a fuel tank.

FIG. 4 shows a shape in a side view of the fuel tank 6. The front tank stay 41 is integrated with a front end of the fuel tank 6 by welding while overlapping. A seat part 46 is integrated with the bottom part 45 by soldering from below. From a corner portion in the vicinity of a rear end of the bottom part 45, a rear end 53a of the return pipe 53 is protruded backward. Note that the fuel tank 6 can be formed of an appropriate material such as metal or resin.

Figure 5:
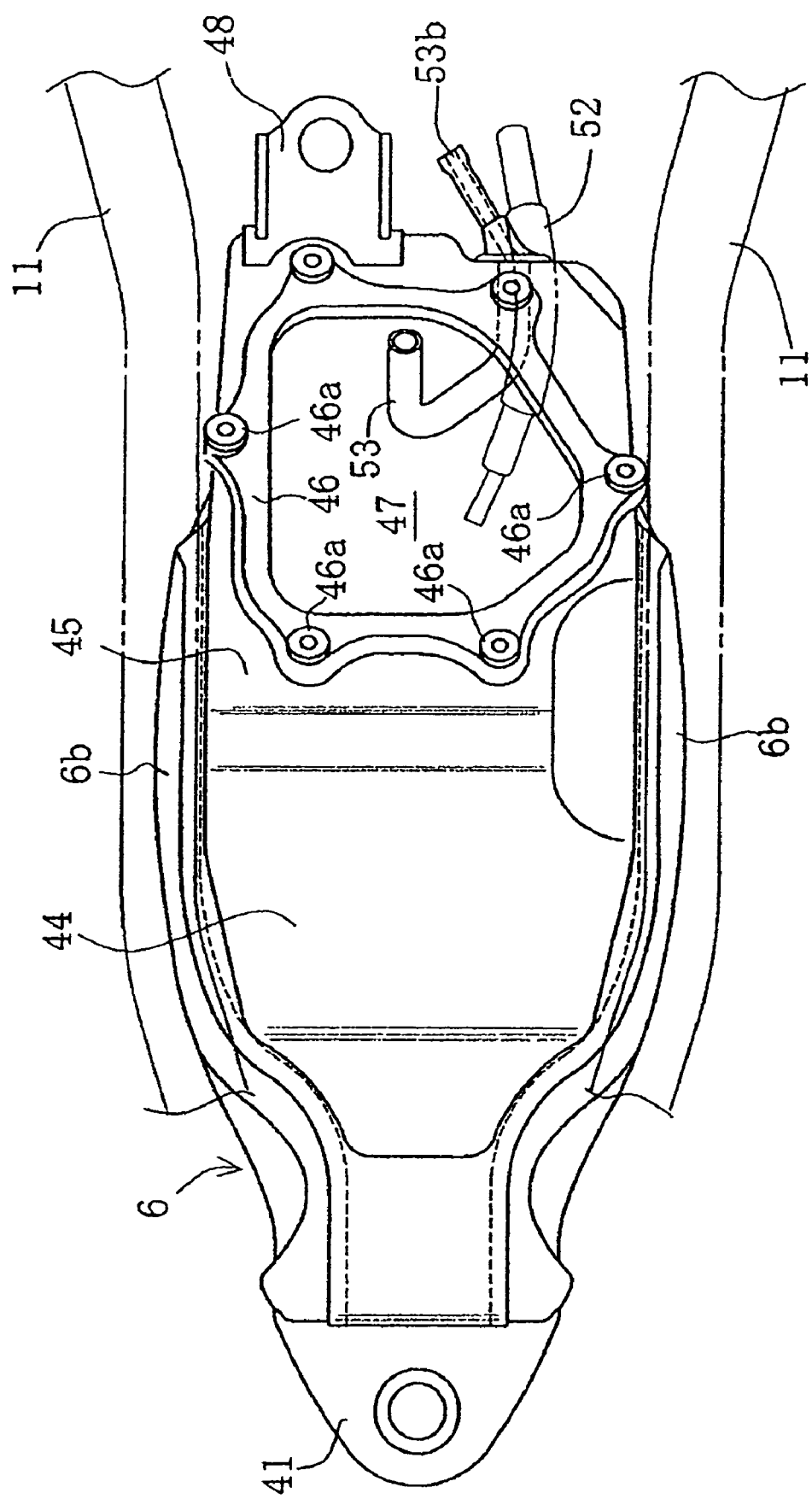
FIG. 5 is a bottom view of the fuel tank.

FIG. 5 is a bottom view of the fuel tank 6. The flange part 6b formed on the side of the fuel tank 6 overlaps the left and right main frames 11, and the lower part 44 comes between the left and right main frames 11. In the bottom part 45, an opening 47 for inserting the fuel pump unit 50 is provided. In the seat part 46 surrounding the opening 47, bosses 46a for attaching the cup 51 are provided at suitable intervals. The seat part 46 is provided across the full horizontal width of the bottom part 45. The rear tank stay 48 protruded from the rear end of the fuel tank 6 is provided on one side of the vehicle body.

Figure 6:
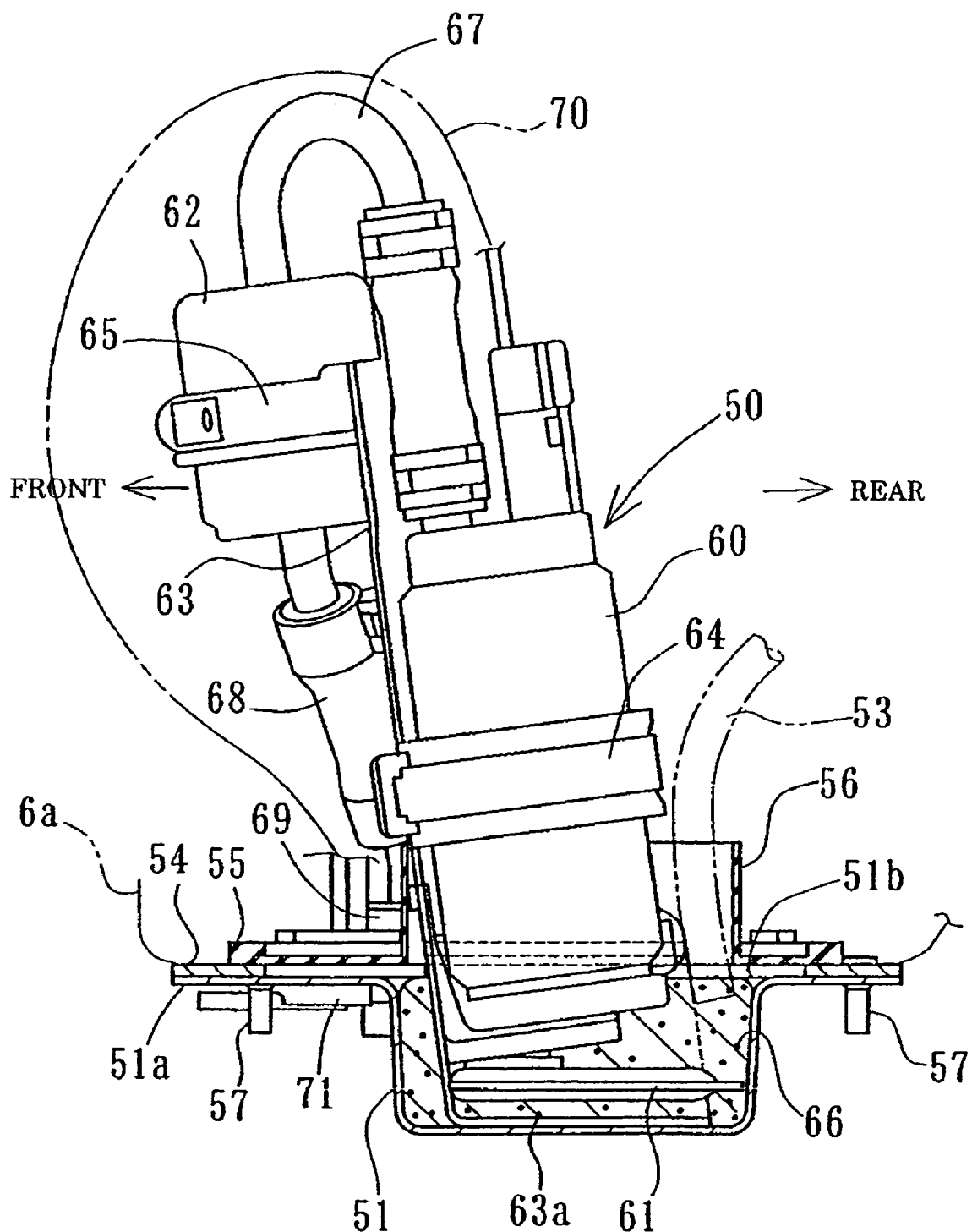
FIG. 6 is a side view of a fuel pump unit.
Figure 7:
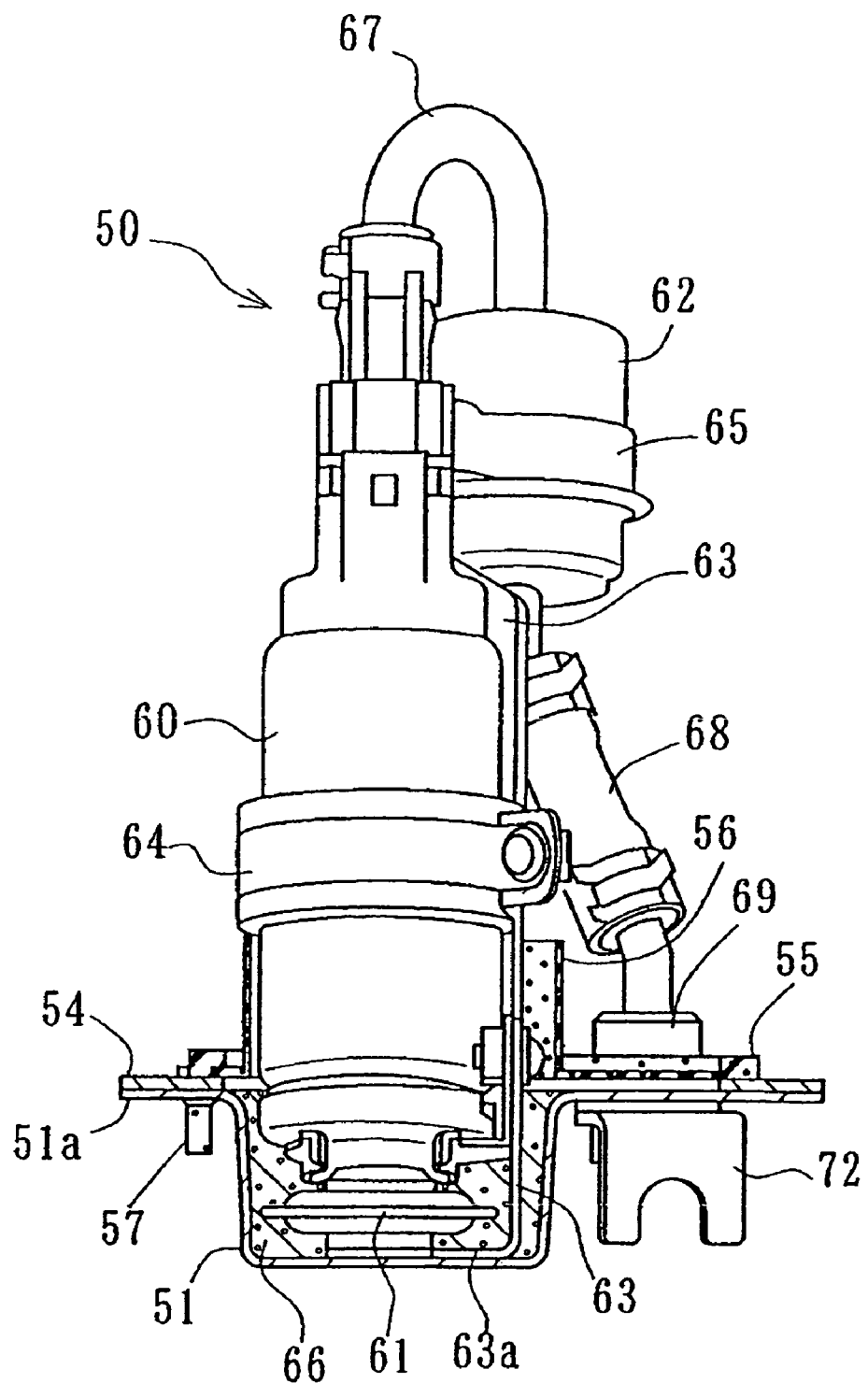
FIG. 7 is a front view of the fuel pump unit.

FIG. 6 is a shape in a side view of the fuel pump unit 50, and FIG. 7 is a shape in a front view thereof. In each of the drawings, the cup 51 is cutaway. In these drawings, the fuel pump unit 50 is integrated in such a manner that a pump 60, a suction filter 61 are fixed with a band 64 on a pump stay 63 and the discharge filter 62 is similarly fixed with a band 65.

The suction filter 61 is set in the cup 51, and a bottom 63a of the pump stay 63 is integrated with a bottom of the cup 51 by welding. The cup 51 is filled with a fuel retaining member 66 to wrap the suction filter 61 and a lower portion of the pump 60. The fuel retaining member 66 is made of a porous material with an excellent fuel adsorption property, which is formed of a laminated body of fibers, an appropriate sponge-like material or the like. The laminated body of fibers is obtained by, for example, laminating fibers woven into a net so as to be folded to obtain a block. As such a fiber material, resin fibers such as polypropylene, metal fibers such as stainless steel wool, inorganic fibers such as glass wool, and the like are cited. Such a porous material is a member having a great number of minute gaps, which can store the fuel in these minute gaps.

Around an opening 51b opened upward of the cup 51, a flange 51a is integrally formed outward. The flange 51a is layered under a cup stay 54 from below and integrated therewith by soldering, the cup stay 54 being provided parallel to the flange 51a. The cup stay 54 has an opening in its center portion, the opening having a width larger than that of the opening 51b of the cup 51. The cup stay 54 is superimposed on only the flange 51a and welded thereto by soldering to be integrated.

A packing 55 is superimposed on the cup stay 54. It is intended that when the cup 51 is attached to the seat part 46 provided in the bottom part 45 of the fuel tank 6 by use of the flange 51a, the packing 55 is interposed between the flange 51a and the seat part 46 for liquid-tight sealing. In a center portion of the packing 55, a vertical wall 56 is integrally formed.

The vertical wall 56 is a cylindrical ring-like wall. A width of its opening is narrower than that of the opening of the cup 51. A height of the vertical wall 56 and an opening area of a communicating hole that is a space surrounded by the vertical wall are set so as to satisfy predetermined conditions to be described later and not to allow the fuel in the cup 51 to easily flow toward the side of the main body part 6a. In a peripheral portion of the packing 55, positioning protrusions 57 are protruded downward and integrally provided. The positioning protrusions 57 are inserted into attachment holes provided in the flange 51a to engage and attach the packing 55 to the flange 51a. By attaching the packing 55, a lower portion of the packing presses and fixes the fuel retaining member 66. Thus, the packing 55 serves also as a cover member that is a pressing member for the fuel retaining member 66.

The return pipe 53 enters inside the vertical wall 56 and the cup 51, and is inserted into an upper portion of the fuel retaining member 66. The fuel discharged from the pump 60 is sent to the discharge filter 62 through a hose 67 and filtered again therein. Thereafter, the fuel is sent to the fuel hose 52 through a hose 68 from a joint 69 positioned outside the vertical wall 56. The joint 69 is protruded to the lower side of the flange 51a while penetrating the flange 51a and to the outside of the cup 51.

Moreover, a cord 70 is extended upward from the top of the pump 60, extended downward after turned above the discharge filter 62, and connected to a connector 71 fixed to a back side of the flange 51a. Reference numeral 72 in FIG. 7 is a stay of the fuel hose connected to the joint 69. The fuel pump unit 50 is previously sub-assembled in such a manner that the pump 60, the suction filter 61, the discharge filter 62 and the like are integrated on the pump stay 63, the bottom 63a of the pump stay 63 is integrated with the cup 51, and the fuel retaining member 66 is housed in the cup 51 and fixed by use of the packing 55. Accordingly, an installation operation can be finished only by attaching the fuel pump unit 50 to the bottom part 45 of the fuel tank.

The cup 51 is a part storing the fuel to be supplied to the pump 60 housed in the main body part 6a of the fuel tank 6. The cup 51 is set so as to satisfy predetermined conditions which secure capacity capable of continuing fuel supply for a predetermined time even when attitude of the vehicle body undergoes such a drastic change as to make it difficult to supply the fuel to the pump 60. The predetermined conditions are arbitrarily determined according to specifications. For example, the cup 51 is set to be able to supply the fuel continuously for about 30 seconds in a state of climbing up a steep slope of 70° with an accelerator pressed all the way down.

Figure 8:
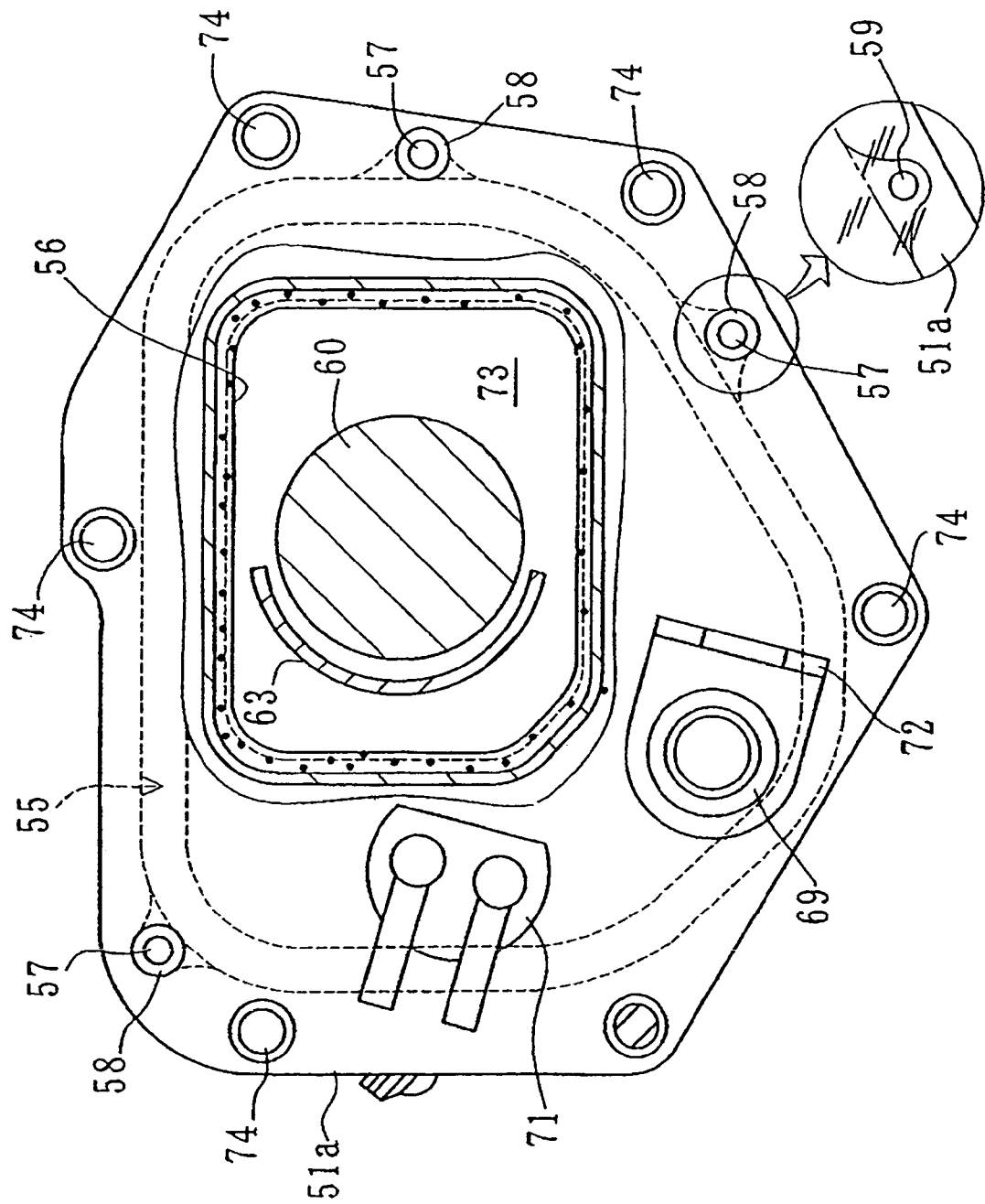
FIG. 8 is a bottom view of the fuel pump unit.

FIG. 8 is a bottom view of the fuel pump unit 50, showing the cutaway cup 51 portion. The cup 51 and the vertical wall 56 form an approximately rectangular shape, and the pump 60 is positioned in a center portion thereof. A periphery of the pump 60 is surrounded by the pump stay 63 having an approximately semicircular shape with a space therebetween. A communicating hole 73 is formed between the pump 60 and the vertical wall 56. Through this communicating hole 73, the inside of the cup 51 and the side of the main body part 6a of the fuel tank 6 thereabove are communicated with each other. Thus, the fuel can be moved therebetween.

In a peripheral portion of the flange 51a, positioning holes 59 (shown without the positioning protrusion 57 in the enlarged view) and screw inserting holes 74 are provided at predetermined intervals. The positioning protrusions 57 of the packing 55 are inserted into and engaged with the positioning holes 59. By inserting unillustrated screws into the screw inserting holes 74, the screws are fastened into the bosses 46a (FIG. 5) of the seat part 46 provided in the bottom part 45 of the fuel tank 6.

Figure 9:
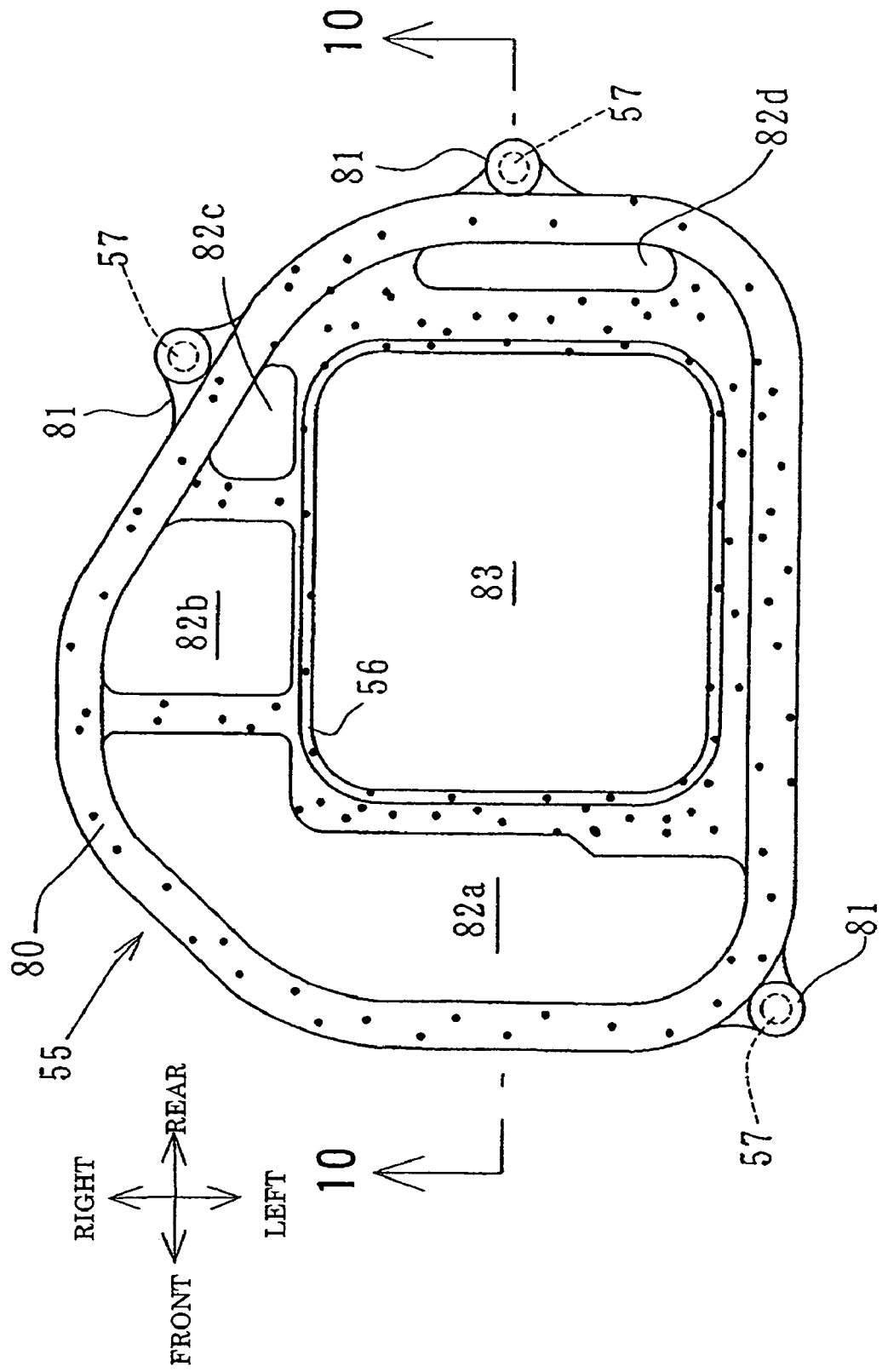
FIG. 9 is a plan view of a packing.
Figure 10:
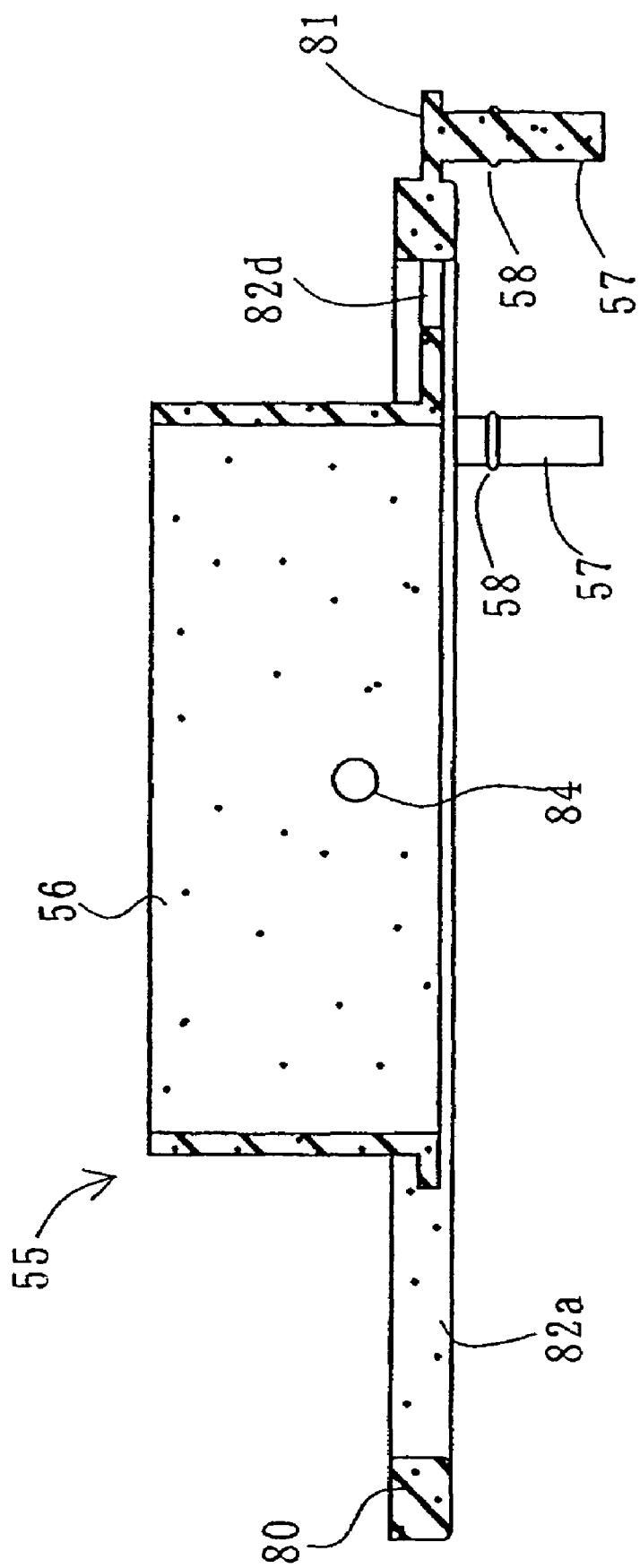
FIG. 10 is a cross-sectional view taken along the line 10-10 in FIG. 9.

FIG. 9 is a plan view of the packing 55. FIG. 10 is a cross-sectional view taken along the line 10-10 in FIG. 9. In these drawings, the packing 55 is formed of an appropriate material having an excellent sealing property, such as rubber. The outer shape thereof is approximately the same shape as that of the flange 51a, and a peripheral part thereof forms a thick-walled edge part 80. At appropriate positions on the outside of the peripheral part, a plurality of bosses 81 are integrally provided, and the positioning protrusions 57 are integrally formed therein. Around the protrusions 57, ring-like projections 58 are integrally formed (see FIG. 10), which serve as engagement means when the protrusions 57 are inserted into the positioning holes 59.

Around the vertical wall 56, lightening holes 82a to 82d are provided at appropriate positions. There is a space 83 inside the vertical wall 56, and a part of this space 83 practically serves as the communicating hole 73. These lightening holes 82a to 82d allows the vertical wall 56 to deform when a fairly large fuel pump unit 50 is inserted into the space 83. Particularly, since the fuel pump unit 50 passes through the front side of the space 83 while tilting forward, the lightening hole 82a in front of the vertical wall 56 widely opens to enable large deformation of the vertical wall 56. The directions of front to rear, left to right and the like are shown in FIGS. 6 and 9, which are based on the vehicle body when the fuel tank is mounted on the vehicle body. Moreover, the respective lightening holes 82a to 82d help weight saving of the entire packing 55, and a part of the holes serves as a piping space for inserting the hose 68.

As shown in FIG. 10, a fuel distribution hole 84 is formed at an appropriate position on the side of the vertical wall 56 so as to penetrate the wall. Through this fuel distribution hole 84, the fuel is made movable between the cup 51 and the inside of the main body part 6a of the fuel tank 6. The fuel distribution hole 84 allows the space 83 inside the vertical wall 56 to communicate with the side of the main body part of the fuel tank 6 and enables movement of the fuel. However, the fuel distribution hole 84 is not indispensable, and provision thereof is arbitrary. Moreover, when the fuel distribution hole 84 is provided, a height, a position in the front to rear direction, an opening size, the number and the like are arbitrarily set according to specifications.

Figure 11:
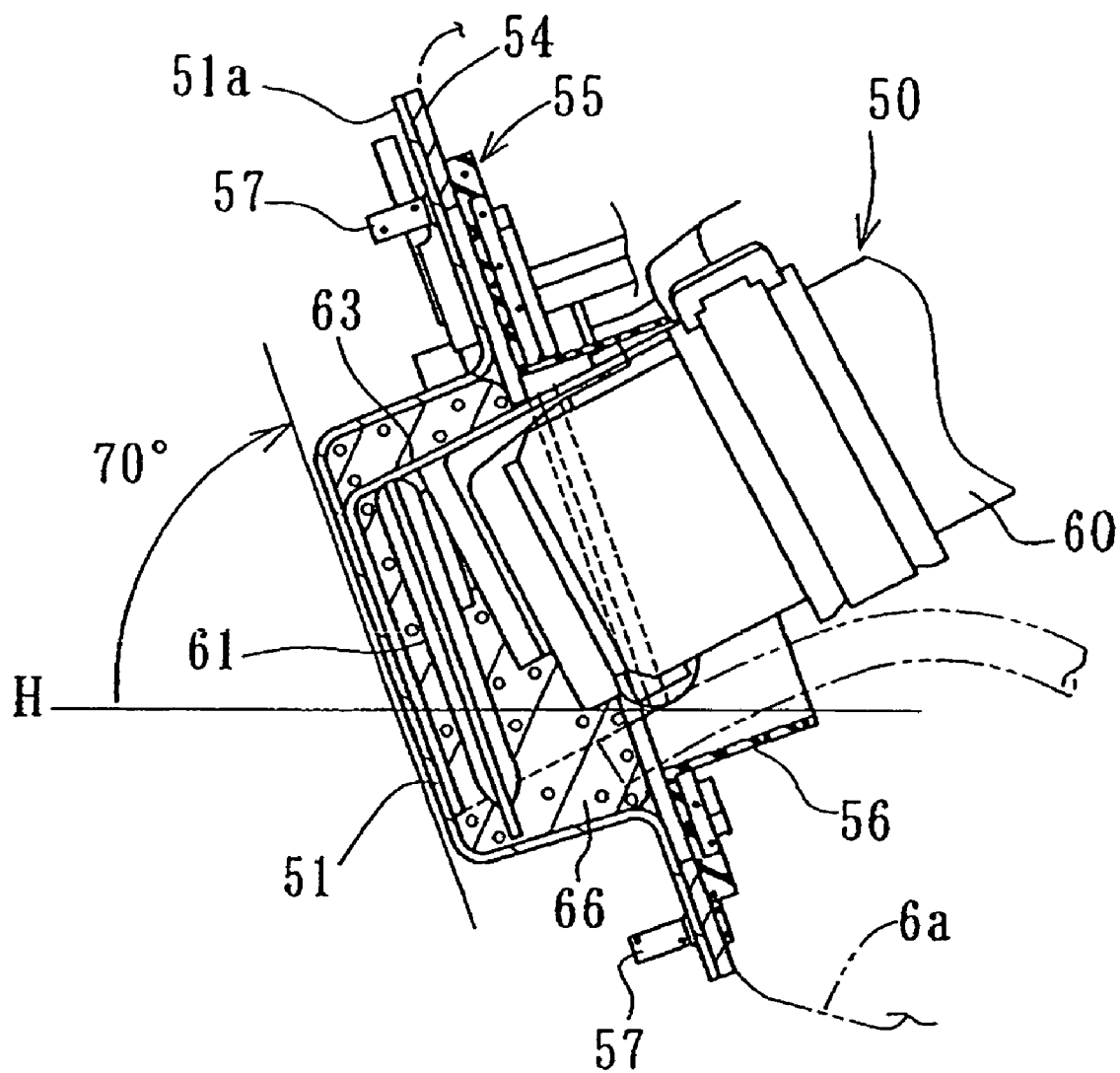
FIG. 11 is an explanatory view of an operation.

Next, an operation of this embodiment will be described. As shown in FIG. 11, when the vehicle climbs up a steep slope of about 70°, for example, in a state of a low fuel level, the fuel moves one-sidedly toward the rear side of the fuel tank 6, and a horizontal line H passes a top edge of the vertical wall 56. Thus, an oil level gets lower than the vertical wall 56, which causes a case where the fuel cannot be supplied into the cup 51. However, even in such a case, since the fuel is contained and retained by the fuel retaining member 66, the fuel is sucked in from the fuel retaining member 66. Thus, the fuel can be supplied sustainably for about 30 seconds under predetermined fuel supply conditions, for example, where the throttle is opened wide when the vehicle body tilts at 70° to the upper side thereof. Moreover, compared to the case where the fuel retaining member 66 is provided in the main body part 6a of the fuel tank, the fuel retaining member 66 is loaded into the cup 51 having a relatively small capacity. Thus, a total amount of use of the fuel retaining member 66 can be reduced. Consequently, weight and costs can be suppressed.

Moreover, since the packing 55 which also serves as a cover is provided between the cup 51 and the bottom part 45 of the fuel tank, it becomes easy to fix and retain the fuel retaining member 66 in the cup 51. Furthermore, the space 83 serving as the communicating hole 73 (FIG. 8) for distributing the fuel between the cup 51 and the main body part 6a of the fuel tank as well as the fuel distribution hole 84 which also functions as described above are provided in the packing 55 that is the cover. Thus, by changing opening areas, the numbers and dispositions of the space 83 and the fuel distribution hole 84, it is possible to effectively prevent the fuel in the cup 51 from jumping out toward the side of the main body part 6a of the fuel tank.

In addition, the vertical wall 56 provided around the space 83 makes it possible to more effectively prevent the fuel in the cup from jumping out toward the side of the tank. Moreover, the packing 55 also serves as a sealing member between the cup 51 and the bottom part of the fuel tank, in addition to its function as the cover. Thus, the number of components can be reduced.

Furthermore, the fuel pump unit 50 can be assembled into the fuel tank 6 in the state where the cup 51, the fuel retaining member 66, the pump 60 and the packing 55 that is the cover also serving as the sealing member are sub-assembled. Thus, an assembly process can be simplified.

Furthermore, the packing 55 that is the cover can be positioned and attached to the cup 51 just by inserting the plurality of positioning protrusions 57 into the positioning holes 59 provided in the flange 51a of the cup 51. Thus, a sealing property for the fuel can be improved, and the assembly process can be simplified. In this event, the fuel retaining member 66 can be easily housed in the cup 51 from the relatively large opening 51b. Thereafter, the fuel retaining member 66 can be easily fixed just by being covered from above with the packing 55 to be engaged with the flange 51a.

Moreover, since the fuel retaining member 66 is a member formed by laminating fibers or a spongy member, the member is relatively inexpensive and easily loaded into the cup 51. Moreover, the fuel retaining member 66 can also be used in place of a fuel filter.

Furthermore, when excess fuel discharged into the cup 51 from the pressure regulator of the fuel supply system is sucked into the pump 60 passing through the fuel retaining member 66, air bubbles contained in the excess fuel are eliminated in the fuel retaining member 66. Thus, it is possible to prevent the pump 60 from sucking the fuel containing the air bubbles. Accordingly, fuel containing few air bubbles can be supplied to the electronic fuel injector in which mixing of air bubbles should be avoided as much as possible. Thus, it becomes suitable as a fuel pumping unit in this kind of device.

Figure 12:
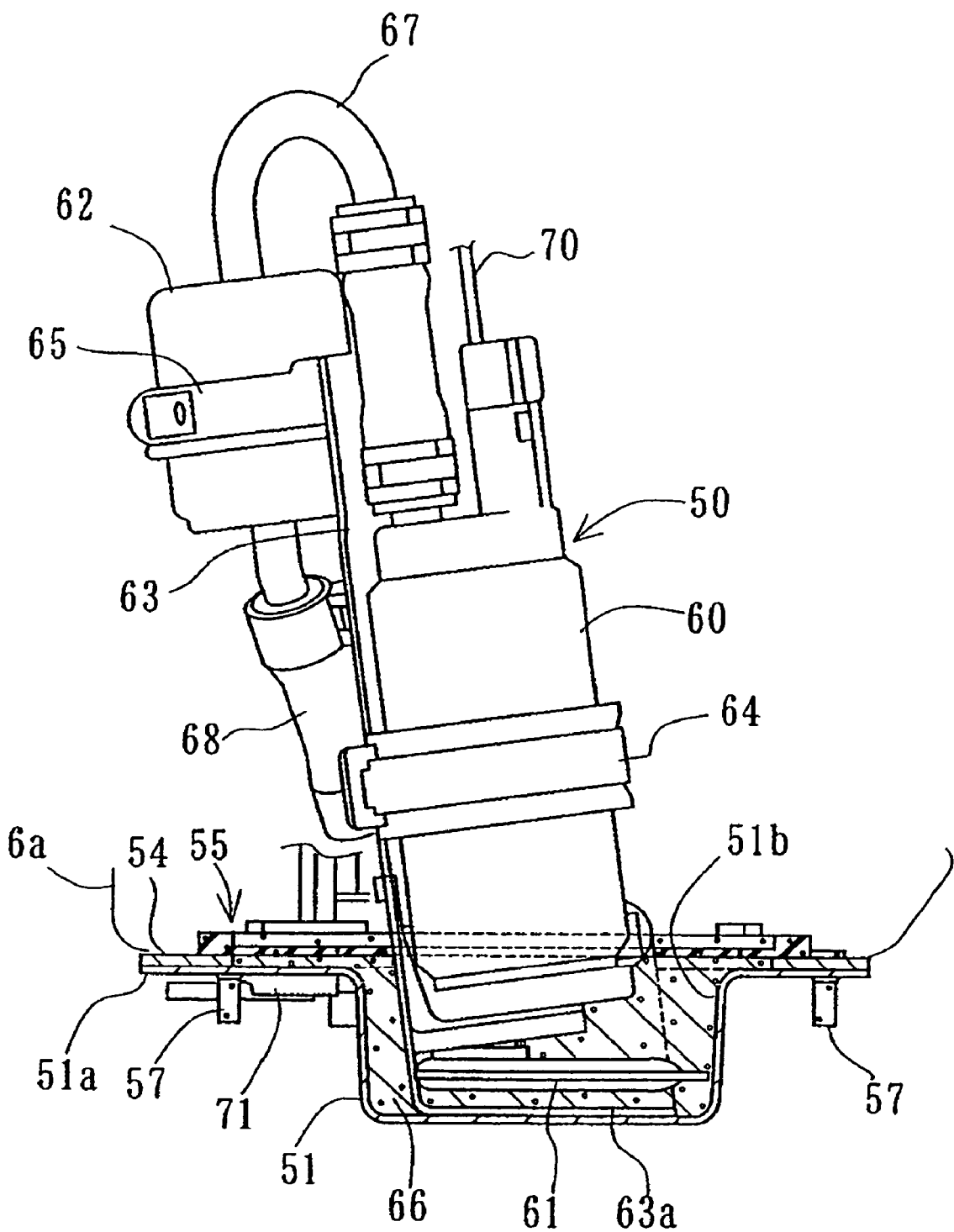
FIG. 12 is a view similar to FIG. 6 according to another embodiment.
Figure 13:
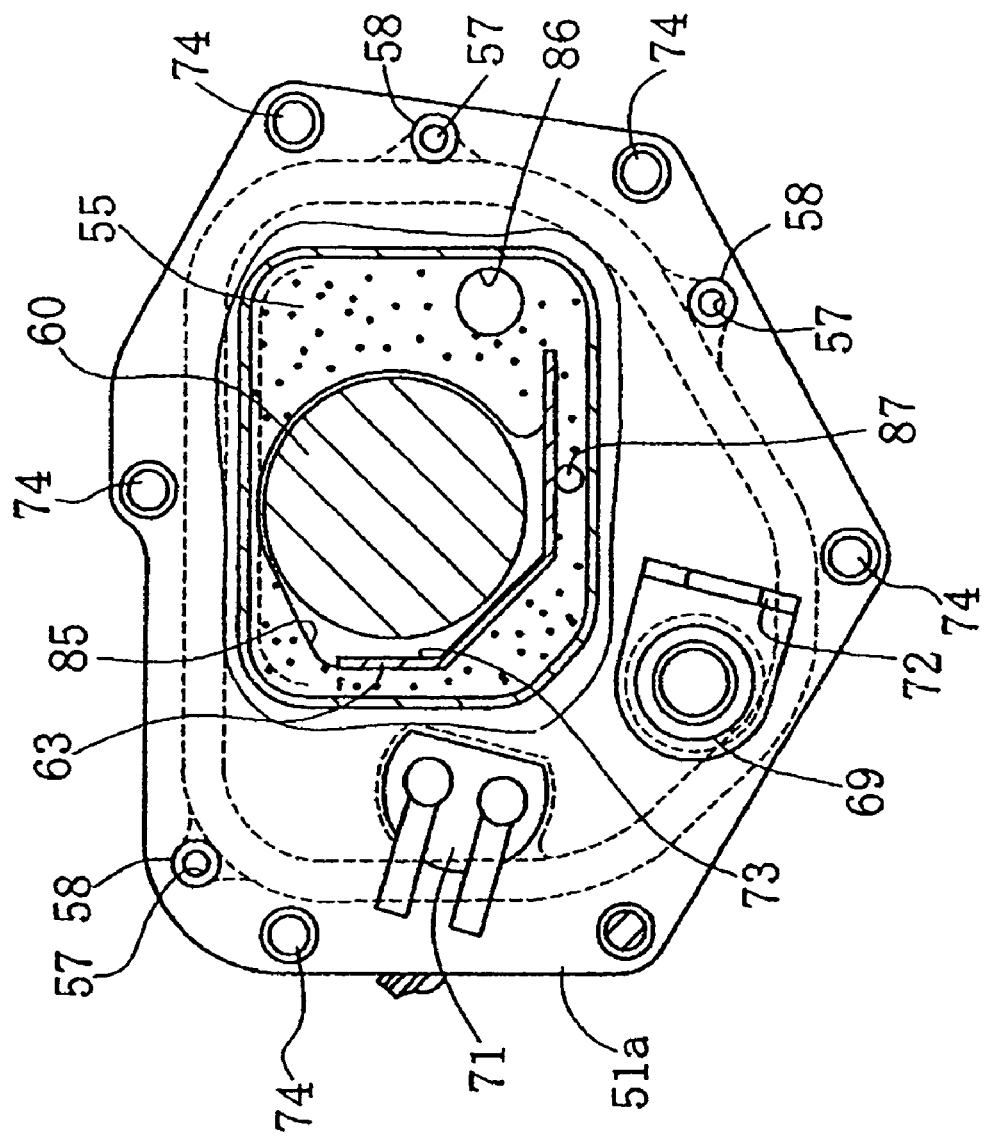
FIG. 13 is a view similar to FIG. 8 according to above another embodiment.

Next, another embodiment will be described. FIG. 12 and FIG. 13 correspond to FIG. 6 and FIG. 8, respectively. This example is different from the one described above in that the vertical wall 56 is not provided in the packing 55 and the communicating hole 73 has a slightly different shape. The common parts will be denoted by the common reference numerals below, and repetitive description will be omitted.

In this example, the packing 55 is provided so as to broadly cover the opening 51b of the cup 51, and the pump 60 and the pump stay 63 are inserted into a center portion of the packing 55. The pump stay 63 is bent to surround an approximately half of a periphery of the pump 60. A space between the pump stay 63 and the pump 60 forms the communicating hole 73, through which the fuel moves between the cup 51 and the main body part of the fuel tank.

As shown in FIG. 13, in the packing 55, a relatively small opening 85 is formed, into which the pump 60 and the pump stay 63 can be inserted. A space inside this opening 85 forms the communicating hole 73. Moreover, a through-hole 86 for allowing the return pipe 53 to pass through is provided near the wall of the cup 51. Furthermore, a relatively small communicating hole 87 is provided while penetrating in a vertical direction between the outside of the pump stay 63 and the wall of the cup 51. Through the communicating hole 87, the fuel moves between the cup 51 and the main body part of the fuel tank. However, the communicating hole 87 is not indispensable, and provision thereof as well as a formation position, an opening size, the number and the like are appropriately set.

According to this example, even if the vertical wall 56 as described in the foregoing embodiment is not provided, it is made possible to prevent the fuel from jumping out of the cup 51 and flowing toward the side of the main body part 6a of the fuel tank when the attitude of the vehicle body is drastically changed as described above. In addition, the fuel can be supplied for a predetermined time.

Figure 14:
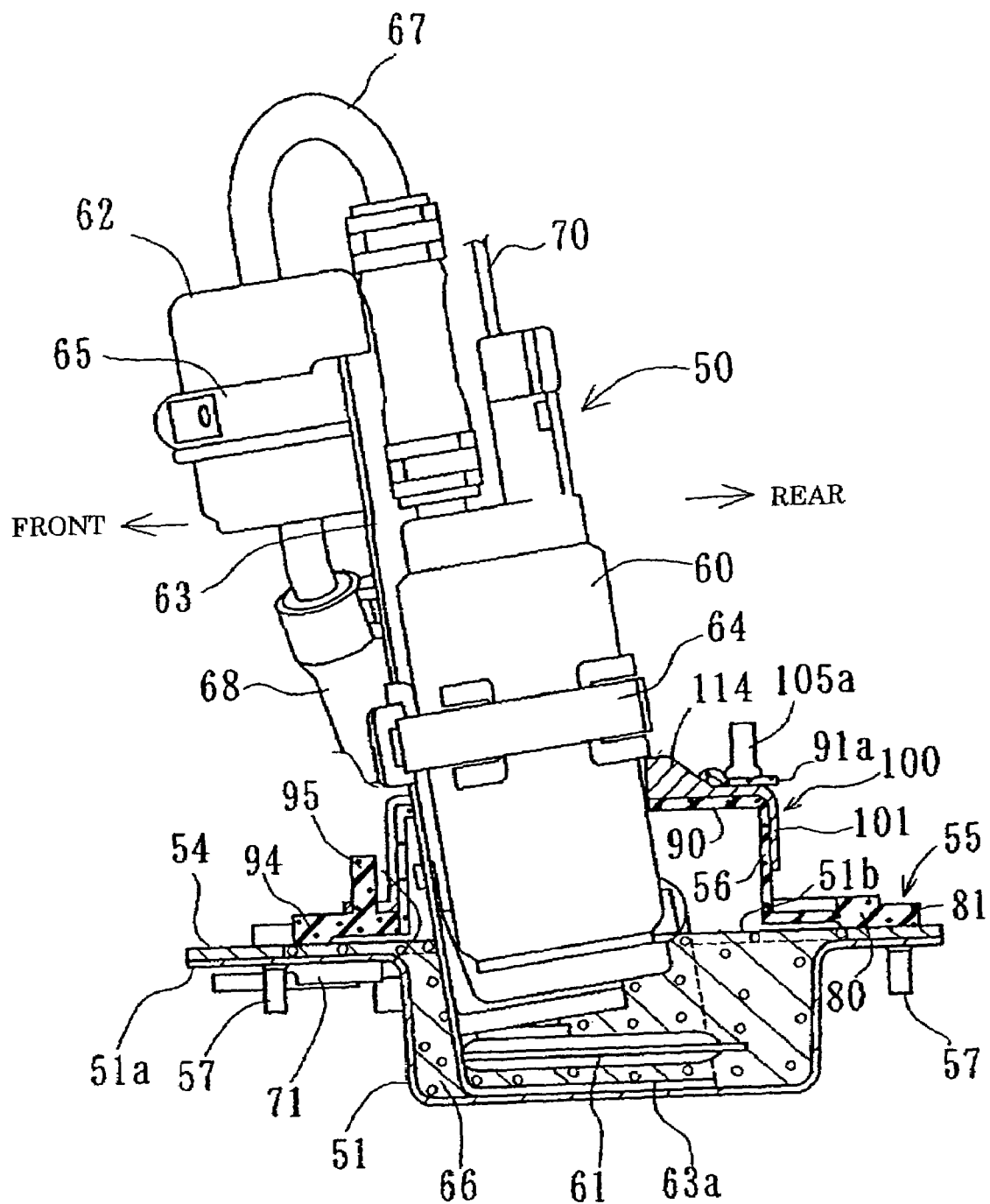
FIG. 14 is a view similar to FIGS. 6 and 12 according to still another embodiment.

Still another embodiment will be shown in FIGS. 14 to 22. In this embodiment, another cover 100 is attached to the packing 55 having the vertical wall 56. FIG. 14 corresponds to FIG. 12 and shows a cross-section in the front to rear direction passing approximately the center of the pump 60. Although the structure of the side of the cup 51 is common in this embodiment and the embodiments described above, a structure of the side of the packing 55 of this embodiment is different from those described above. This packing 55 has the vertical wall 56 as in the case of the one shown in FIG. 6, and is covered with another cover 100. The cover 100 approximately seals the space in the front to rear direction of the vehicle body shown in the drawing so as to cause almost no gap with the rear side of the pump 60. Thus, the fuel flows into the cup 51 through a communicating hole 93 (to be described in detail later) which is formed on the side of the vertical wall 56.

Figure 15:
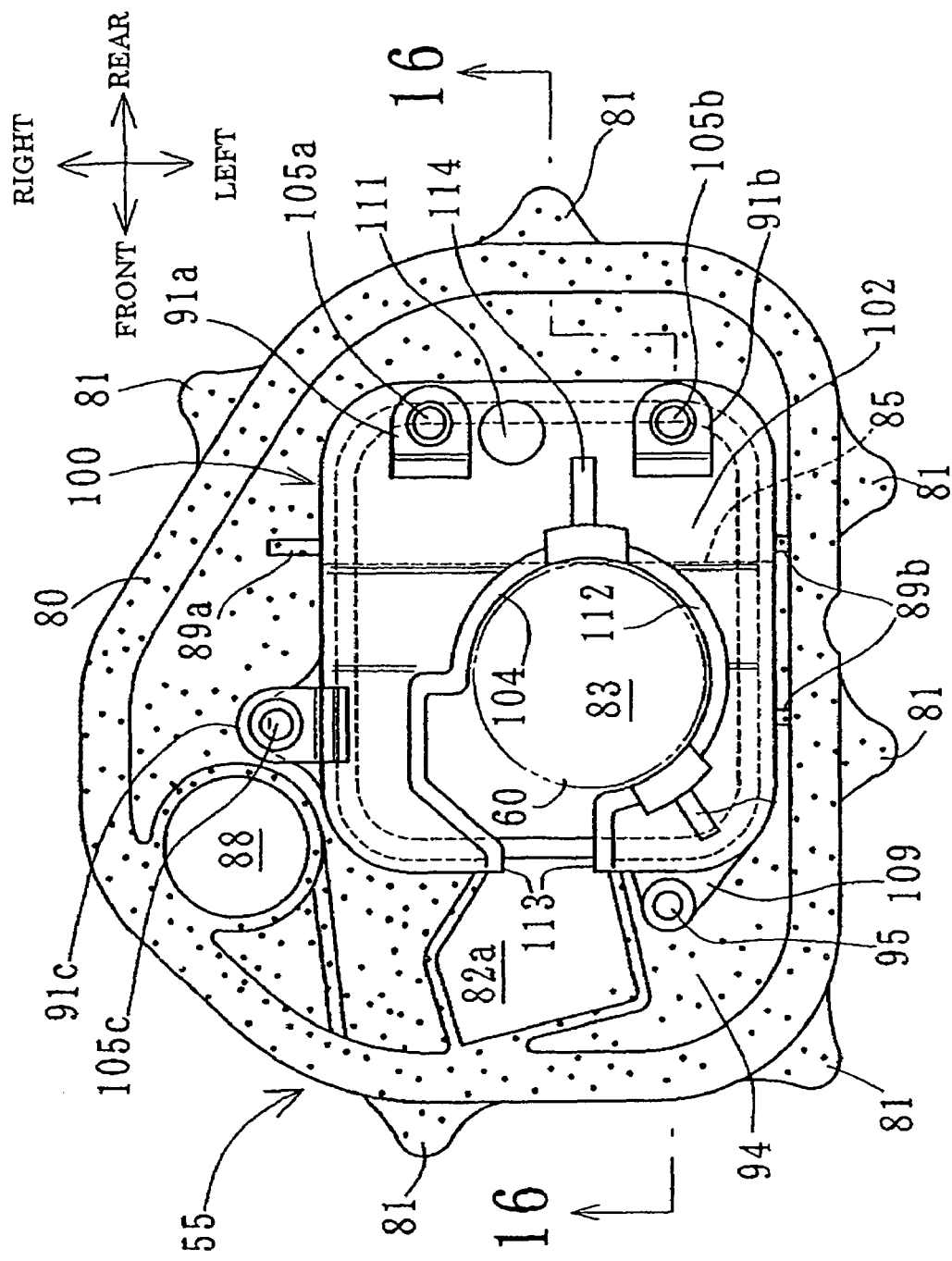
FIG. 15 is a plan view of a packing covered with a cover according to the embodiment.
Figure 16:
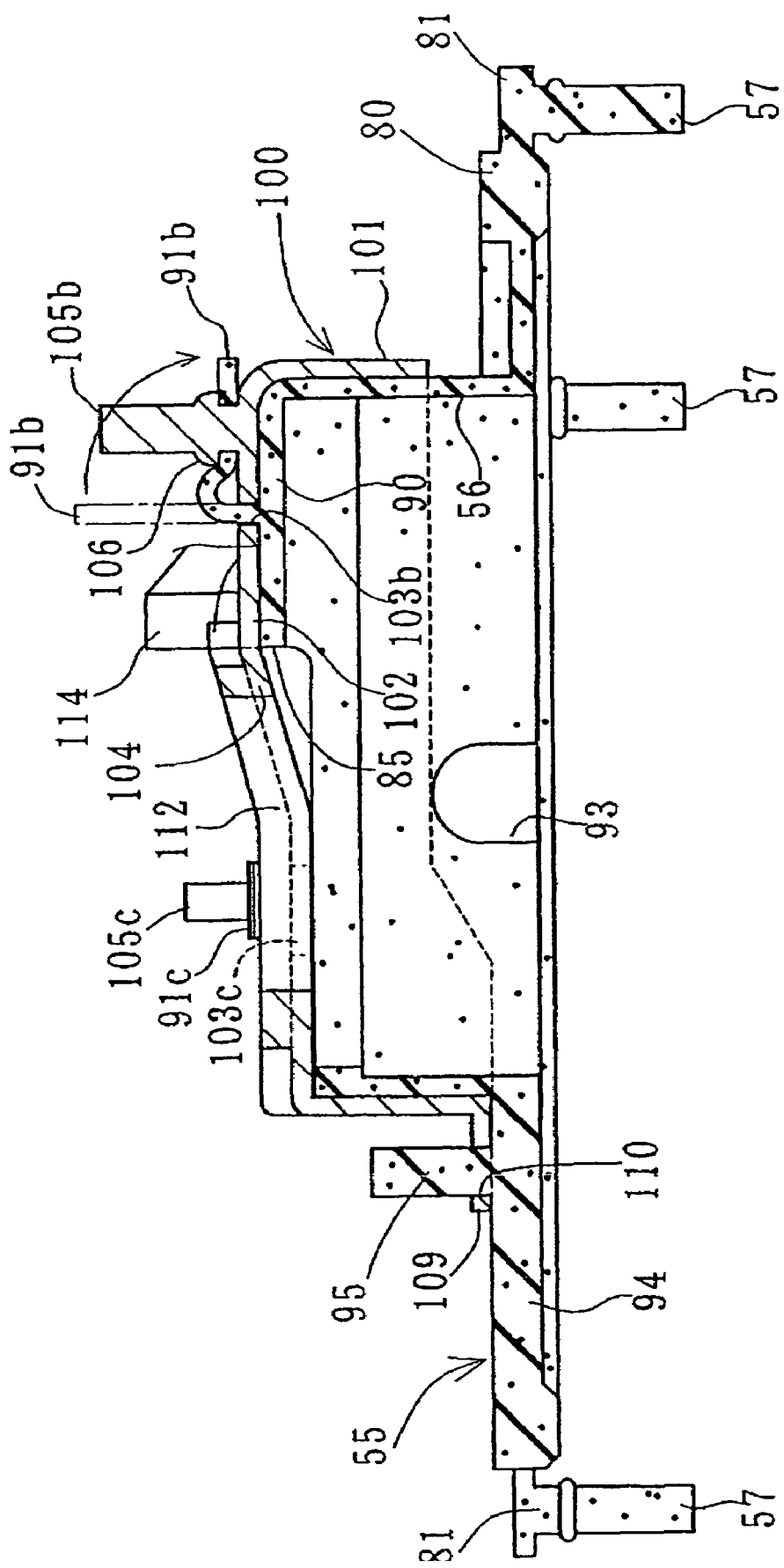
FIG. 16 is a cross-sectional view taken along the line 16-16 in FIG. 15.

FIG. 15 is a plan view of the packing 55 having the cover 100 attached thereon. FIG. 16 is a cross-sectional view taken along the line 16-16 in FIG. 15. The cover 100 is laid so as to surround the periphery of the vertical wall 56, and a sidewall 101 thereof overlaps the outside of the vertical wall 56. Moreover, a ceiling part 90 (FIG. 14) is integrally provided on a rear side of an upper part of the vertical wall 56. A ceiling part 102 of the cover 100 is superposed on the ceiling part 90.

Engaging pieces 91a to 91c integrally protruded upward from the ceiling part 90 of the packing 55 are engaged with protrusions 105a to 105c integrally protruded upward from the ceiling part 102 on the side of the cover 100. Moreover, a protrusion 95 integrally protruded upward from a vertical wall peripheral part 94 of the packing 55 is engaged with a projection 109 which is provided in a lower part of the cover 100 and protruded forward. Thus, the cover 100 and the packing 55 are integrated.

Figure 17:
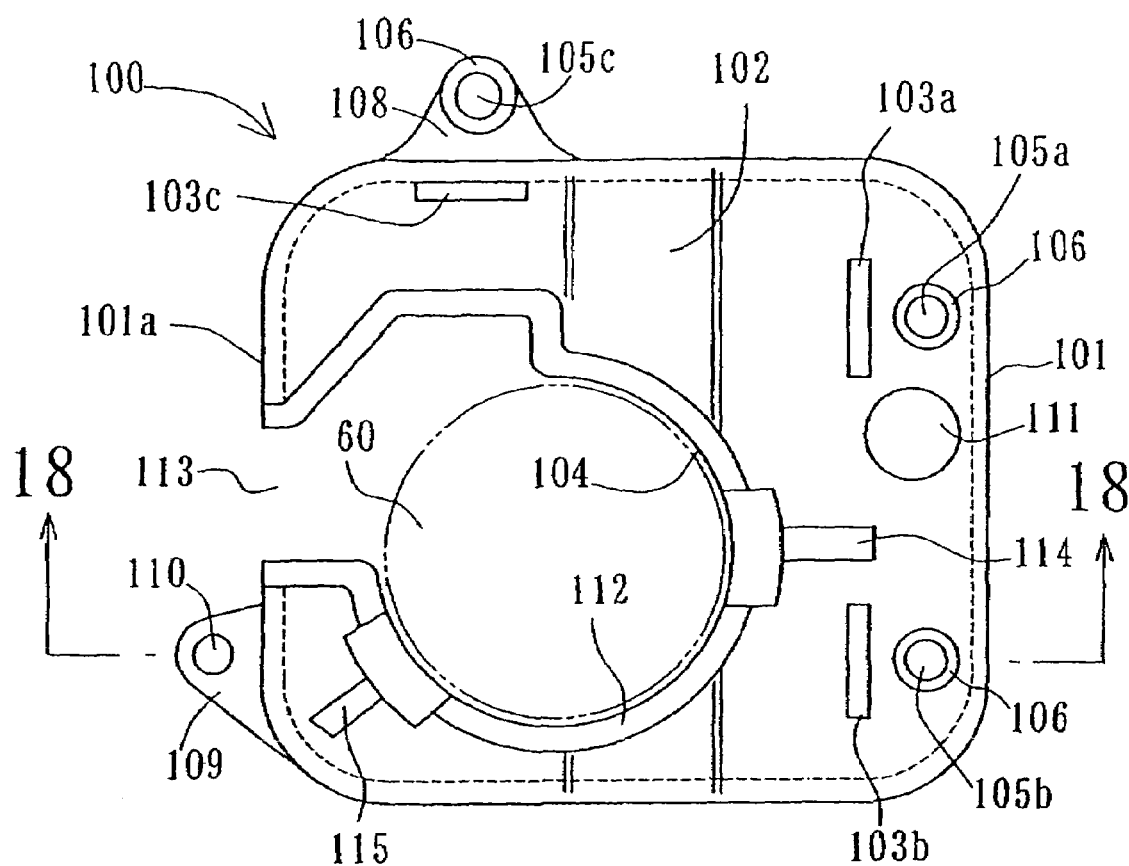
FIG. 17 is a plan view of the cover according to the embodiment.
Figure 18:
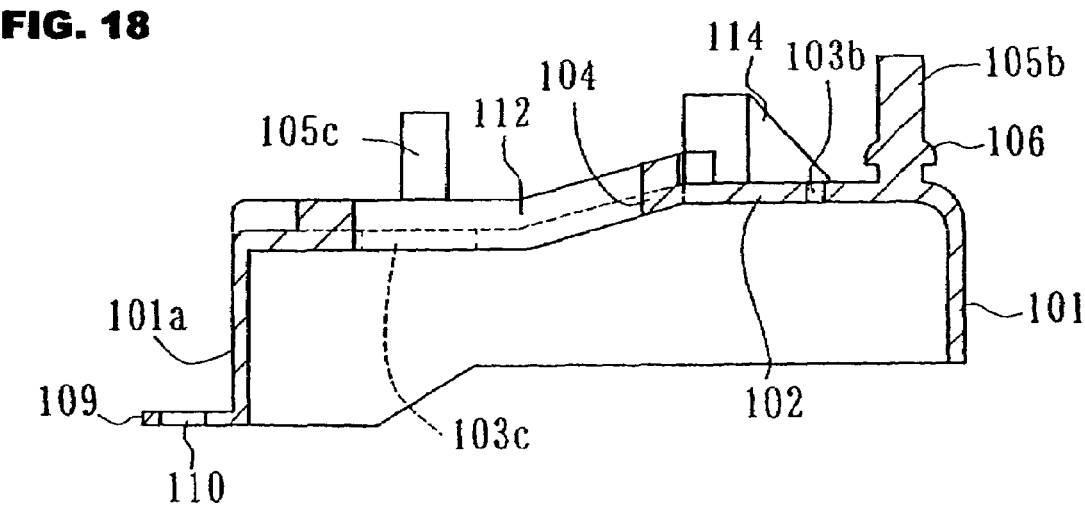
FIG. 18 is a cross-sectional view taken along the line 18-18 in FIG. 17.

FIG. 17 is a plan view of the cover 100. FIG. 18 is a cross-sectional view taken along the line 18-18 in FIG. 17. As shown in these drawings, the cover 100 is made of an appropriate material having a relatively good elasticity, and includes the sidewall 101 having an approximately rectangular tubular shape when planarly viewed (FIG. 17). At a position closer to the front in the ceiling part 102, an opening 104 for fitting the fuel pump unit 50 is formed. This opening 104 is surrounded by a vertical flange 112 having an approximately ¾ arc shape, of which front side is opened. This vertical flange 112 comes into close contact with the rear surface side from left and right in the periphery of the pump 60 so as not to form a gap on the rear side.

A front part of the vertical flange 112 reaches left and right edges of a slit 113 formed in a front wall 110a on the front side of the vehicle body in the sidewall 101. The slit 113 is stretched out so that the fuel pump unit 50 can be fitted into the opening 104. This vertical flange 112 is reinforced by ribs 114 and 115 which are integrally formed between the flange and the ceiling part 102. The rib 114 is protruded backward from a backmost portion of the vertical flange 112. The rib 115 is protruded obliquely forward and to the left from a front end of the arc portion of the vertical flange 112 near the sidewall 101 on the left side of the vehicle body.

In the ceiling part 102 on the rear side of the opening 104, a pair of slits 103a and 103b having an elongated hole shape are formed across the rib 114. A pair of protrusions 105a and 105b are formed in left and right corner portions in the vicinities of the respective slits 103a and 103b. In an intermediate portion between the left and right protrusions 105a and 105b, a through-hole 111 for inserting the return pipe 53 (FIG. 6) is formed.

The slits 103a and 103b penetrate the ceiling part 102 in the vertical direction and have a size capable of inserting the engaging pieces 91a and 91b (FIG. 16) thereinto from below to above. The protrusions 105a and 105b have an approximately cylindrical shape, and wide diameter parts 106 are integrally formed in lower portions of the respective protrusions 105a and 105b. The protrusion 105c has the same structure as that of the protrusions 105a and 105b.

In the front side of the ceiling part 102, a slit 103c, through which the engaging piece 91c of the packing 55 passes upward from below, is formed in a corner portion on the right side of the vehicle body across the opening 104. Although the slit 103c has the same elongate hole shape as that of the slits 103a and 103b, a longitudinal direction thereof is disposed in a direction perpendicular to those slits 103a and 103b. Moreover, a projection 108 is integrally formed to be protruded toward the right side from the front portion of the sidewall 101 on the right side in the vicinity of the slit 103c. In the projection 108, the protrusion 105c is integrally formed to be protruded upward.

The projection 109 integrally protruded forward is formed from a lower end of the front wall 101a on the left side of the vehicle body across the slit 113. A hole 110 is provided in the projection 109. It is formed such that, through this hole 110, the protrusion 95 of the packing 55 passes upward from below. The projections 108 and 109 are formed so as to be separated on the upper and lower sides (see FIG. 18).

Figure 19:
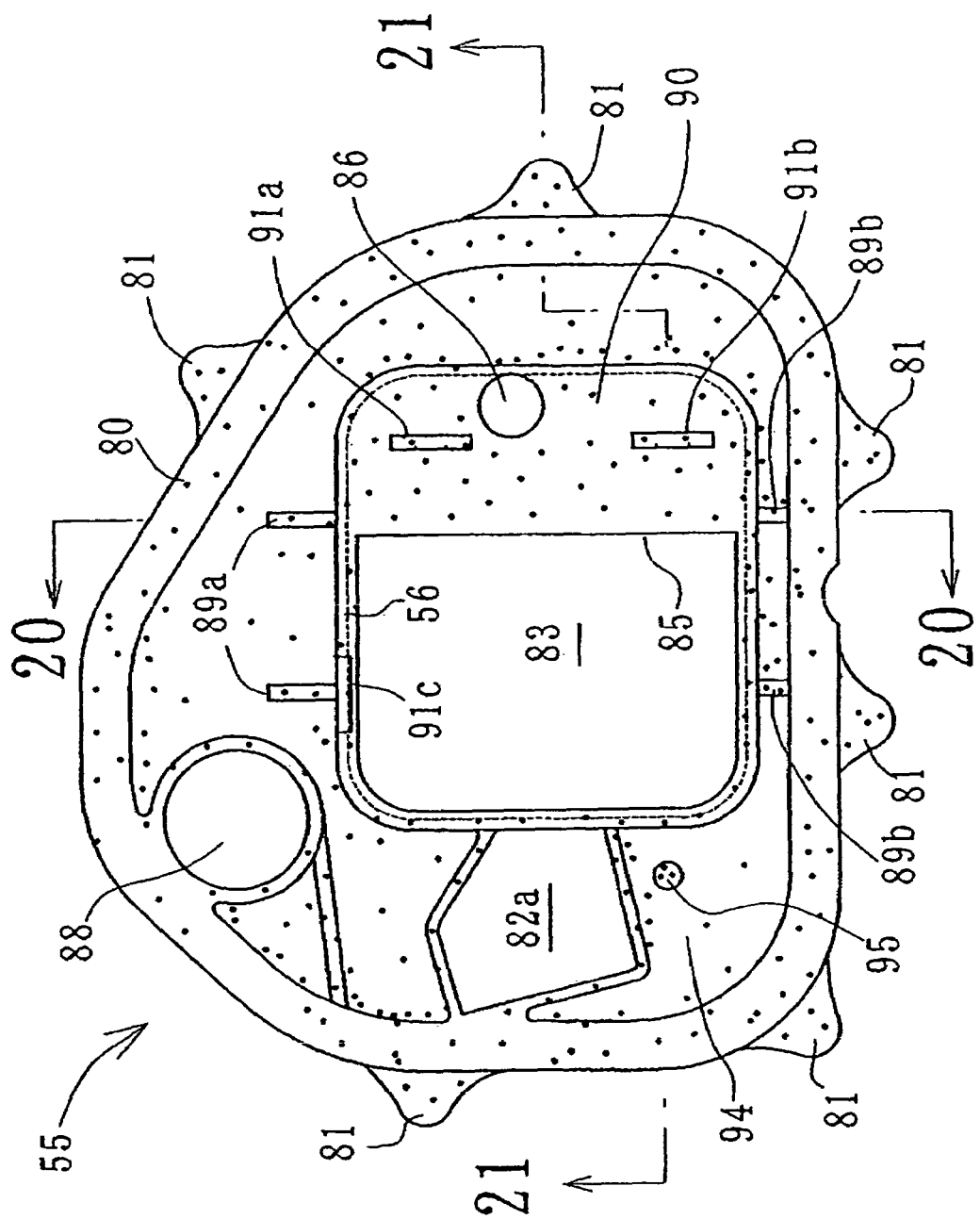
FIG. 19 is a plan view of the packing according to the embodiment.

FIG. 19 is a plan view of the packing 55. Moreover, FIG. 21 partially shows a cross-sectional view taken along the line 21-21 in FIG. 19. As shown in these drawings, the packing 55 has the vertical wall 56 provided in the center thereof, the vertical wall having an approximately rectangular tubular shape when planarly viewed (FIG. 19). Around the vertical wall 56, the vertical wall peripheral part 94 having approximately the shape of a flat plate is integrally formed. The thick-walled edge part 80 is formed in the entire outer peripheral portion of the packing 55.

The ceiling part 90 is integrally provided so as to cover a part of the opening 85 on the upper end side of the vertical wall 56. An area of the ceiling part 90 can be arbitrarily controlled. In an intermediate portion in the longitudinal direction of the ceiling part 90, the through-hole 86 for inserting the return pipe 53 (FIG. 6) is formed. Across this through-hole 86, the pair of engaging pieces 91a and 91b are integrally formed so as to be protruded upward. Similarly, in the front end side of the vertical wall 56 on the right side, the engaging piece 91c is integrally formed so as to be protruded upward. The respective engaging pieces are provided in the form of thin plates so as to correspond with the slits 103a to 103c. A plane direction in a flat portion of the engaging piece 91c is perpendicular to that of the engaging pieces 91a and 91b.

The above-described engaging pieces 91a and 91b have the same structure as that of the engaging piece 91c. The flat portion of each piece has a tongue-like shape, as in the case of the engaging piece 91c shown in FIG. 21, which can be freely bent. In the respective pieces, engaging holes 92 are formed so as to penetrate the pieces. An inside diameter of each of the engaging holes 92 in the engaging pieces 91a to 91c is set to be the same as or slightly smaller than a general diameter (an outside diameter in a portion other than the wide diameter part 106) of each of the corresponding protrusions 105a to 105c. The inner diameter can be expanded to be larger than an outside diameter of the wide diameter part 106 by elastic deformation.

Figure 20:
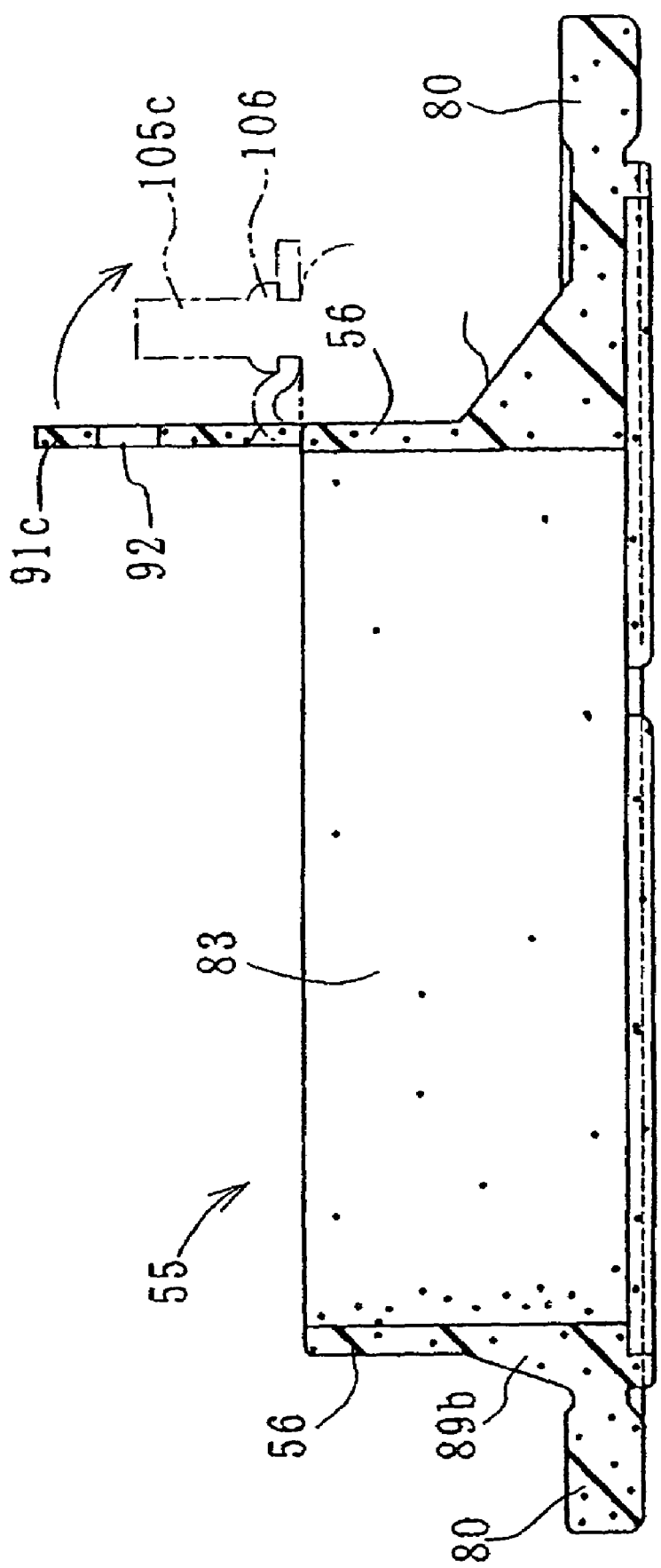
FIG. 20 is a cross-sectional view taken along the line 20-20 in FIG. 19.

In front of the vertical wall 56 in the vertical wall peripheral part 94, the lightening hole 82a is provided. This lightening hole 82a facilitates deformation of the vertical wall 56 in insertion of the fuel pump unit 50 as in the case of foregoing embodiments. Furthermore, in the outer peripheral portion of the vertical wall peripheral part 94, a hose hole 88 for inserting the hose 68 (FIG. 14) is formed so as to penetrate the part. Moreover, in left and right opposite wall portions of the vertical wall 56, a plurality of ribs 89a and 89b are integrally formed, respectively. FIG. 20 is a cross-sectional view taken along the line 20-20 in FIG. 19, showing the ribs 89a and 89b. As is clear from this drawing, these ribs 89a and 89b are integrally formed so as to have an approximately triangular shape between the lower periphery of the vertical wall 56 and the vertical wall peripheral part 94.

Figure 21:
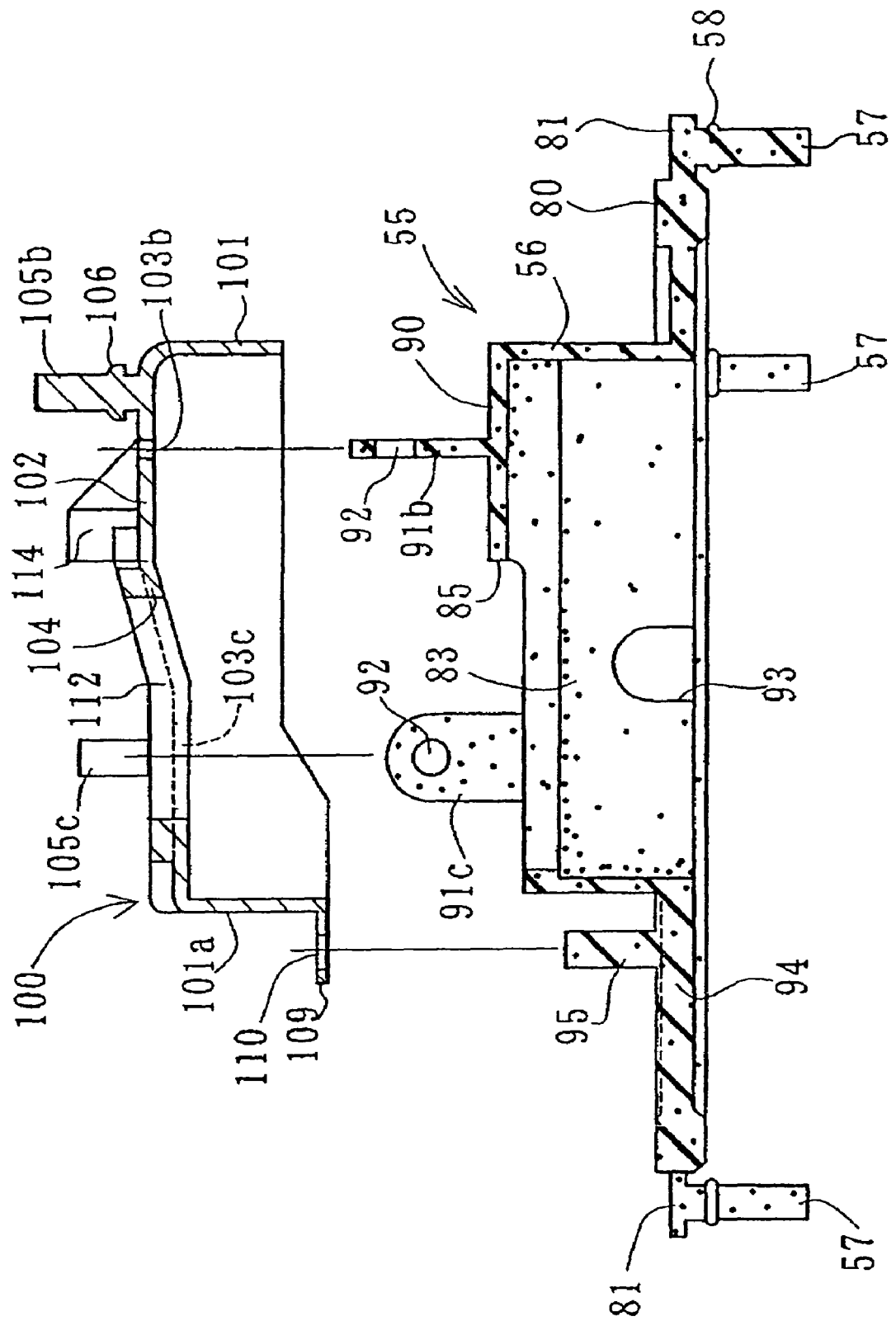
FIG. 21 is a view showing a procedure of assembling the packing and the cover according to the embodiment.

As shown in FIG. 21, the protrusion 95 having an approximately cylindrical shape is integrally formed so as to be protruded upward at a position corresponding to the hole 110 of the projection 109 in a part of the vertical wall peripheral part 94. Moreover, in the lower part of the vertical wall 56, the communicating hole 93 which laterally connects the inside to the outside is formed. The fuel is supplied into the cup 51 through this communicating hole 93. The communicating hole 93 is formed on the front side in the front to rear direction of the vehicle body in the vertical wall 56, and an opening area and the number thereof can be arbitrarily set. Moreover, a formation position of the communicating hole can be arbitrarily set as long as the position is one on the front half side of the vertical wall 56. The front, rear, left and right of the vehicle body have been shown in FIGS. 14 and 15. Moreover, a rear half of the sidewall 101 of the cover 100 in the front to rear direction is shifted upward while forming a step. Accordingly, when the cover 100 is put on the packing 55, the cover does not overlap the communicating hole 93, and the hole can be left open (see FIG. 16).

FIG. 21 shows a procedure of attachment and integration of the packing 55 and the cover 100. The cover 100 is placed on the packing 55 in which the fuel pump unit 50 is previously inserted into the communicating hole 83, and the slit 113 is opened to attach the cover to the fuel pump unit 50. Subsequently, the packing 55 is covered with this cover 100, and the respective engaging pieces 91a to 91c of the ceiling part 90 are inserted into the slits 103a to 103c of the ceiling part 102 from below to penetrate upward. At the same time, the protrusion 95 is inserted into the hole 110 of the projection 109.

Accordingly, the respective engaging pieces 91a to 91c are protruded upward from the upper part of the cover 100, the ceiling part 102 is superposed on the ceiling part 90, and the vertical wall 56 is fitted into the inside of the sidewall 101 in close contact with each other. Then, as indicated by the virtual line in FIG. 16, each of the engaging pieces 91a to 91c is bent on each of the corresponding protrusions 105a to 105c, and these engaging pieces are elastically deformed. The engaging pieces 91a to 91c are released after the respective engaging holes 92 are expanded and drawn down to lower portions of the respective wide diameter parts 106 of the protrusions 105a to 105c. Accordingly, the engaging holes 92 are restored and contracted. Thus, the engaging pieces are firmly engaged with the corresponding protrusions 105a to 105c.

Accordingly, by utilizing elastic deformation of the engaging pieces 91a to 91c, the cover 100 can be easily engaged and integrated with the packing 55. Thus, assembly is facilitated. Moreover, the lower part of the cover 100 and the vertical wall peripheral part 94 can be easily assembled and integrated by use of the protrusion 95 and the projection 109.

Figure 22:
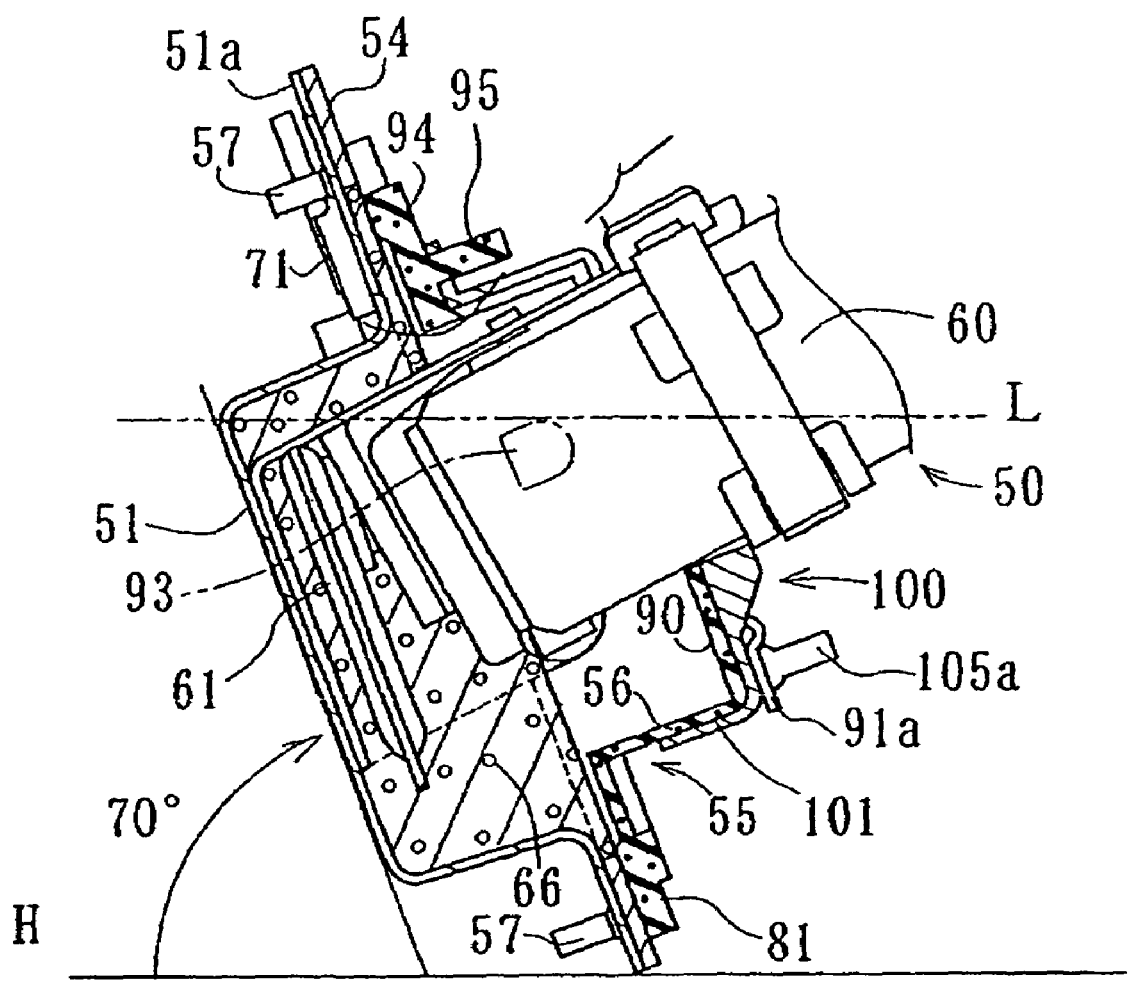
FIG. 22 is an explanatory view of an operation according to the embodiment.

Moreover, since the cover 100 is provided to seal the gap by covering so as not to produce a gap with the rear half side of the pump 60, it is possible to effectively prevent the fuel from jumping out. FIG. 22 is a view similar to FIG. 11 for showing the operation described above. In FIG. 22, when the vehicle climbs up a steep slope of about 70°, for example, in a state of a low fuel level, even if the fuel moves one-sidedly downward, the vertical flange 112 comes into close contact with the rear half side of the side of the pump 60 from behind, when viewed from the side, and seals the space so as not to produce a gap. Thus, it is possible to prevent the fuel in the cup 51 from jumping out to the outside. Consequently, the fuel can be effectively retained in the cup 51 even in such a situation of climbing up a steep slope.

Moreover, particularly the rear half side of the gap around the upper part of the packing 55 and the pump 60 is covered with the cover 100. Accordingly, even when the oil level of the fuel tank is lowered as indicated by the virtual line L to make it difficult for the fuel to flow into the cup 51 from the side of the fuel tank passing above the packing 55, by providing the communicating hole 93 on the side of the vertical wall 56, flow of the fuel into the cup 51 from the fuel tank side can be secured through this communicating hole 93.

Furthermore, the communicating hole 93 is positioned in the front part of the vertical wall 56 in the front to rear direction of the vehicle body when viewed from the side. Accordingly, in climbing up a steep slope as described above, the oil level is further lowered, and outflow of the fuel from the communicating hole 93 becomes larger than expected inflow of the fuel. In such a situation, the communicating hole 93 comes above the oil level, thereby making it possible to prevent the fuel from jumping out of the side of the cup 51 toward the side of the fuel tank.

Figure 23:
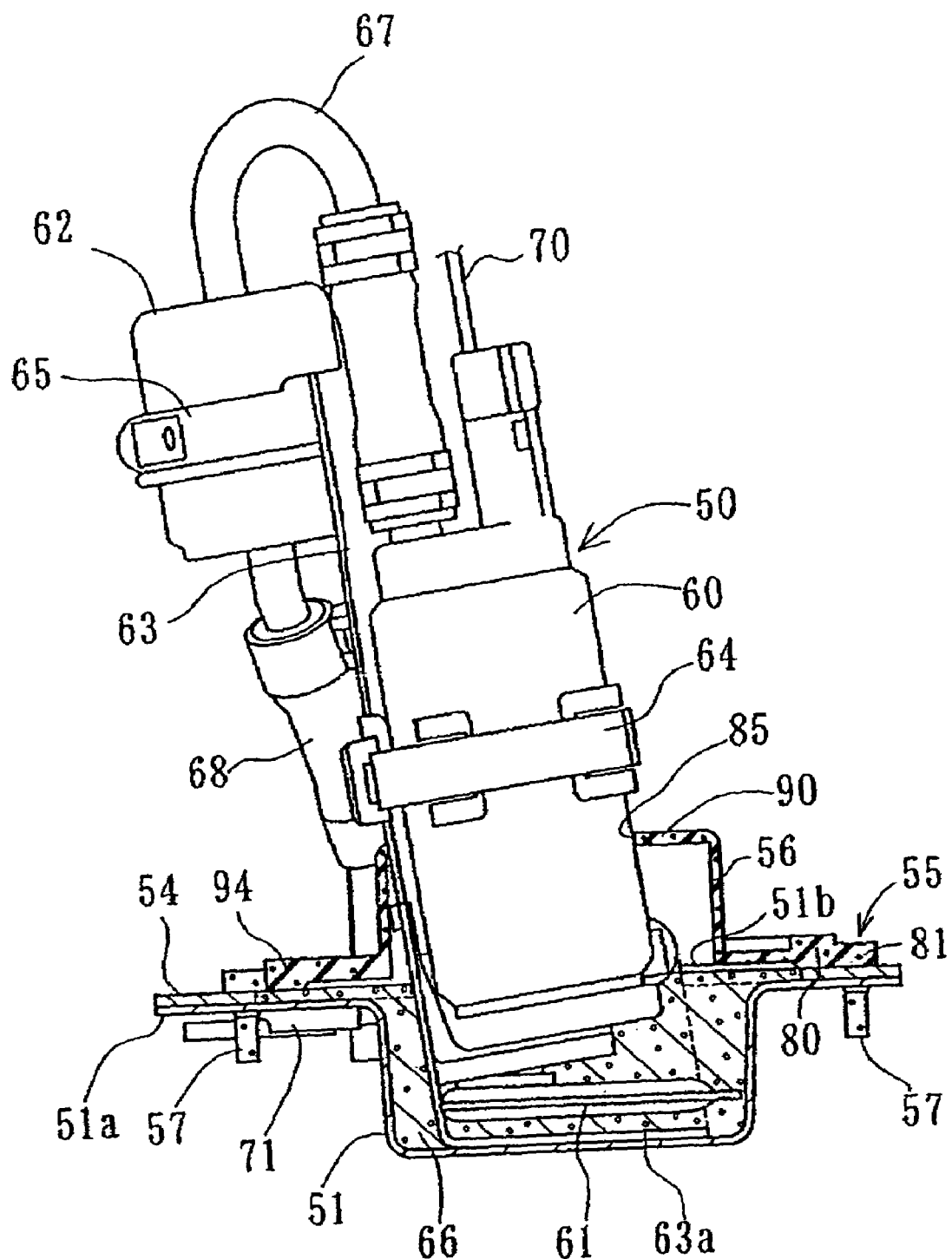
FIG. 23 is a view similar to FIG. 14 according to still another embodiment.
Figure 24:
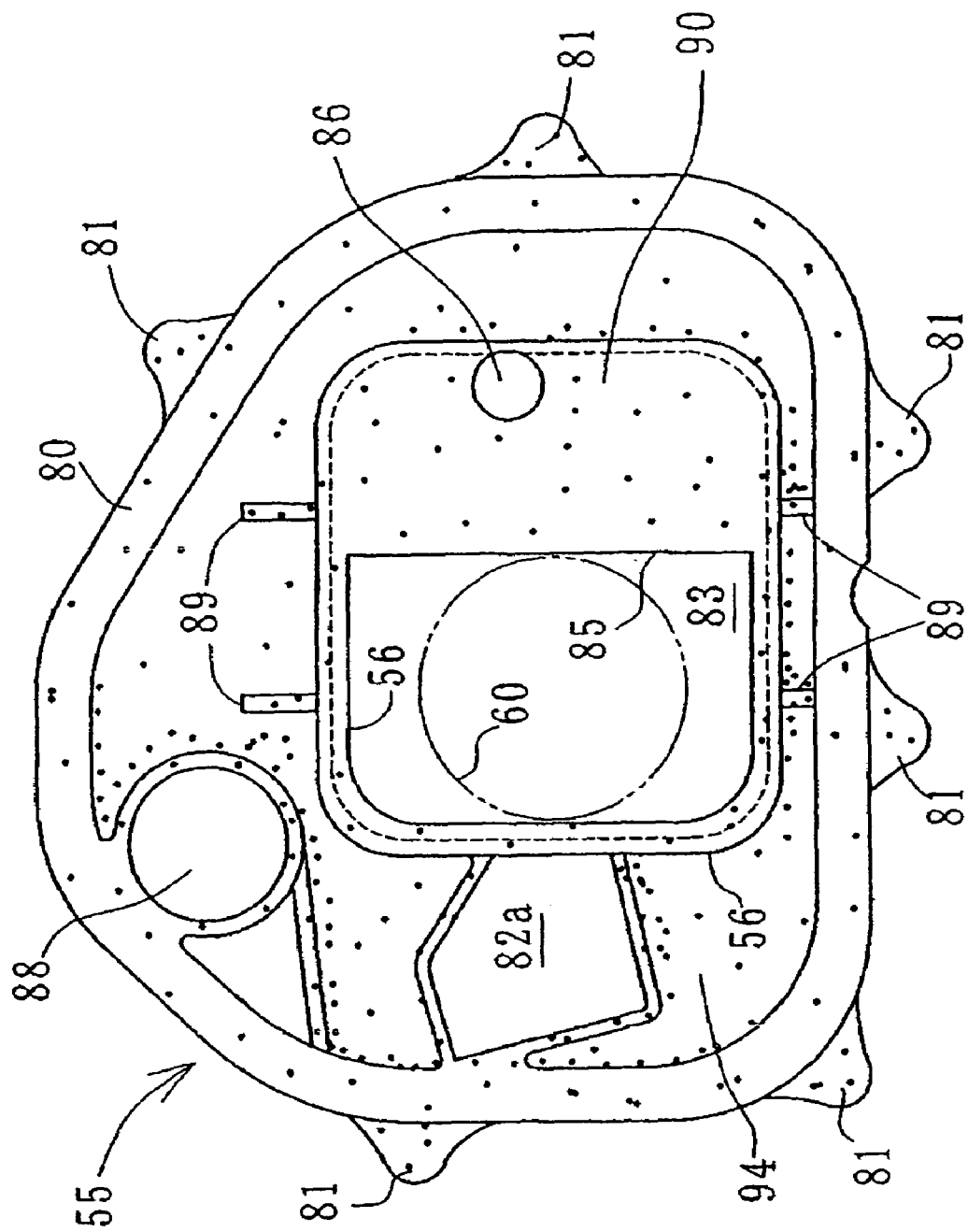
FIG. 24 is a plan view of a packing according to the embodiment.

FIGS. 23 and 24 show another embodiment. This embodiment is approximately equivalent to the one without the cover 100 in the foregoing embodiment. FIG. 23 corresponds to FIG. 14, and FIG. 24 corresponds to FIG. 19. With reference to these drawings, this embodiment is similar to the foregoing embodiment except that the packing 55 includes no attachment structure with the cover. The fuel pump unit 50 is inserted into the opening 85 in front of the ceiling part 90.

Also in such a manner, the ceiling part 90 of the packing 55 approximately seals the gap on the rear side around the pump 60. Thus, it is possible to effectively prevent the fuel in the cup 51 from jumping out to the outside. In addition, since the cover 100 of the foregoing embodiment can be omitted, the number of components can be reduced. Note that an area of the ceiling part 90 in FIG. 24 can be arbitrarily controlled. For example, as indicated by the virtual line, the ceiling part 90 may be expanded forward so as to come into contact with the rear of the peripheral part of the pump 60. In such a manner, a sealing rate of the gap can be controlled to be larger.

Note that the invention of the present application is not limited to the respective embodiments described above, and various modifications and applications are possible within the principle of the invention. For example, the extremely large change in attitude is not limited to when the vehicle climbs up a slope as described above. The present invention is effective also when the oil level is drastically changed such as running down a slope and abrupt acceleration or slowdown. Moreover, adaptive types of vehicles include not only those of off-road specifications but also those of various purposes.

We claim:

1. A fuel tank for a motorcycle, said fuel tank comprising:
   a main body part,
   a downward swelling part that is opened upward and attached to a bottom part of the fuel tank wherein the inside of the downward swelling part is connected to the inside of the main body part, thereabove,
   a fuel pump having a suction part provided in the downward swelling part and a portion above the suction part installed in the main body part of the fuel tank, and
   a fuel retaining member provided in the downward swelling part, whereby fuel retained by the fuel retaining member is sucked by the suction part.

2. The fuel tank accoding to claim 1, wherein the fuel retaining member is any of a member formed by laminating fibers and a spongy member.

3. The fuel tank according to claim 1, wherein the fuel tank comprises a return pipe for discharging excess fuel, which is returned from a pressure regulator of a fuel Supply system into the downward swelling part, and an outlet of the return pipe is disposed at a position distant from the suction part of the fuel pump through the fuel retaining member.

* * * * *